United States Patent
Woodyer et al.

(10) Patent No.: US 12,550,923 B2
(45) Date of Patent: *Feb. 17, 2026

(54) ALLULOSE SYRUPS

(71) Applicant: Tate & Lyle Solutions USA LLC, Hoffman Estates, IL (US)

(72) Inventors: Ryan Woodyer, Hoffman Esates, IL (US); Peter Lloyd-Jones, Hoffman Estates, IL (US)

(73) Assignee: Tate & Lyle Solutions USA LLC, Hoffman Esates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,465

(22) Filed: Apr. 17, 2023

(65) Prior Publication Data

US 2023/0248038 A1  Aug. 10, 2023

Related U.S. Application Data

(63) Continuation of application No. 15/552,944, filed as application No. PCT/GB2016/050422 on Feb. 19, 2016, now Pat. No. 11,653,688.

(60) Provisional application No. 62/168,337, filed on May 29, 2015, provisional application No. 62/120,165, filed on Feb. 24, 2015.

(51) Int. Cl.
| | |
|---|---|
| *A23L 29/30* | (2016.01) |
| *A23L 2/60* | (2006.01) |
| *A23L 27/30* | (2016.01) |
| *A23L 33/125* | (2016.01) |
| *A23L 33/15* | (2016.01) |

(52) U.S. Cl.
CPC ................. *A23L 29/30* (2016.08); *A23L 2/60* (2013.01); *A23L 27/33* (2016.08); *A23L 33/125* (2016.08); *A23L 33/15* (2016.08); *A23V 2002/00* (2013.01); *A23V 2200/02* (2013.01); *A23V 2200/212* (2013.01); *A23V 2250/60* (2013.01)

(58) Field of Classification Search
CPC ........ A23L 29/30; A23L 27/33; A23L 33/125; A23L 2/60
See application file for complete search history.

(56) References Cited

U.S. PATENT DOCUMENTS

| | | |
|---|---|---|
| 4,263,052 A | 4/1981 | Bichsel et al. |
| 5,039,346 A | 8/1991 | White et al. |
| 5,230,742 A | 7/1993 | Lillard, Jr. et al. |
| 7,838,004 B2 | 11/2010 | Mower |
| 8,030,035 B2 | 10/2011 | Oh et al. |
| 9,109,266 B2 | 8/2015 | Takamine et al. |
| 9,144,251 B2 | 9/2015 | Prakash et al. |
| 11,291,233 B2 | 4/2022 | Prakash |
| 11,730,175 B2 | 8/2023 | Meunier |
| 2005/0106305 A1 | 5/2005 | Abraham et al. |
| 2007/0134390 A1 | 6/2007 | Prakash et al. |
| 2009/0304891 A1 | 12/2009 | Fujihara |
| 2011/0237790 A1 | 9/2011 | Lee |
| 2011/0275138 A1 | 11/2011 | Maruta et al. |
| 2012/0076908 A1 | 3/2012 | Fujihara et al. |
| 2013/0251850 A1 | 9/2013 | Mark |
| 2013/0309389 A1* | 11/2013 | Carlson ................ C07H 15/207 426/658 |
| 2014/0271418 A1 | 9/2014 | Woodyer et al. |
| 2014/0271745 A1 | 9/2014 | Glenn, Jr. et al. |
| 2014/0271746 A1 | 9/2014 | Woodyer et al. |
| 2014/0271747 A1 | 9/2014 | Woodyer et al. |
| 2014/0271748 A1 | 9/2014 | Woodyer et al. |
| 2014/0322389 A1 | 10/2014 | Prakash et al. |
| 2014/0342074 A1 | 11/2014 | Kim et al. |
| 2014/0370171 A1 | 12/2014 | Takaoka et al. |
| 2015/0320093 A1 | 11/2015 | Tokuda et al. |
| 2016/0029675 A1 | 2/2016 | Hattori et al. |
| 2016/0302463 A1 | 10/2016 | Woodyer et al. |
| 2016/0331014 A1 | 11/2016 | Perera |
| 2021/0244057 A1 | 8/2021 | Kim et al. |
| 2021/0298322 A1 | 9/2021 | Seo et al. |
| 2022/0079197 A1 | 3/2022 | Bhowmik et al. |
| 2023/0139835 A1 | 5/2023 | Bachmann et al. |
| 2023/0172244 A1 | 6/2023 | Zhang |

FOREIGN PATENT DOCUMENTS

| | | |
|---|---|---|
| CN | 102250157 A | 11/2011 |
| CN | 102429201 A | 5/2012 |
| CN | 103288887 A | 9/2013 |
| CN | 103906437 A | 7/2014 |
| CN | 104105415 A | 10/2014 |
| CN | 103997913 B | 9/2016 |
| CN | 115968924 A | 4/2023 |
| EP | 0613953 A1 | 9/1994 |
| EP | 0613954 A1 | 9/1994 |
| GB | 2536304 A | 9/2016 |
| JP | 03228687 A | 10/1991 |
| JP | 06277099 A | 10/1994 |

(Continued)

OTHER PUBLICATIONS

GRAS Notice (GRN) No. 893, Dec. 3, 2019, 122 pages.
"Rare Sugar Sweet", Matsutani Chemical Industry Co., Ltd., Retrieved from the Internet: https://www.matsutani.co.jp/english/products/raresugar.html [Mar. 13, 2022], 3 pages.
Declaration of Russell Roger Anderson, dated Feb. 2021 re: Australian Patent Applicaiton No. 2016225278, 3 pages.
Exhibis RRA-1 of the Declaration of Russell Roger Anderson re: Austrlain Patent Application 2016225278, dated Feb. 10, 2021, 133 pages.
Declaration of David R. Dodds re: Australian Application No. 2016225278, dated Feb. 9, 2021, 11 pages.

(Continued)

*Primary Examiner* — Jeffrey P Mornhinweg
(74) *Attorney, Agent, or Firm* — Matney Legal Group PLLC

(57) ABSTRACT

The present invention relates to allulose syrups, use of allulose syrups in the manufacture of food or beverage products, and food and beverage products made using the allulose syrups.

27 Claims, 24 Drawing Sheets

(56) References Cited

FOREIGN PATENT DOCUMENTS

| | | | |
|---|---|---|---|
| JP | 2004051493 A | 2/2004 |
| JP | 2005263670 A | 9/2005 |
| JP | 2009060803 A | 3/2009 |
| JP | 2011200201 A | 10/2011 |
| JP | 2011205913 | 10/2011 |
| JP | 2012232908 A | 11/2012 |
| JP | 2013179864 A | 9/2013 |
| JP | 2014161312 A | 9/2014 |
| JP | 2015023803 A | 2/2015 |
| KR | 100832339 B1 | 5/2008 |
| KR | 1020090098938 A | 10/2009 |
| KR | 20110041910 A | 4/2011 |
| KR | 20110077866 A | 7/2011 |
| KR | 10-2014-0005891 A | 1/2014 |
| WO | 2005031006 A2 | 4/2005 |
| WO | 2007033278 A2 | 3/2007 |
| WO | 2007081442 A2 | 7/2007 |
| WO | 2008085529 A2 | 7/2008 |
| WO | 2010113785 A1 | 10/2010 |
| WO | 2011040708 A2 | 4/2011 |
| WO | 2011119004 A2 | 9/2011 |
| WO | 2014119718 A1 | 8/2014 |
| WO | 2014140632 | 9/2014 |
| WO | 2014168015 A1 | 10/2014 |
| WO | 2015075473 A1 | 5/2015 |
| WO | 2015094342 A1 | 6/2015 |
| WO | 2022088540 A1 | 5/2022 |
| WO | 2023084114 A1 | 5/2023 |

OTHER PUBLICATIONS

Exhibit DRD-1 for Declaration of David R. Dobbs re: Australian application No. 2016225278, dated Feb. 9, 2021, 139 pages.
Declaration of George William John Fleet re: Australian Application No. 2016225278, dated Feb. 10, 2021, 10 pages. 2021.
Exhibit GF-1 for George Wiliam John FLeet Declaration re: Australian Application No. 2016225278, dated Feb. 10, 2021, 85 pages.
Second Declaration of Samuel Ross Himstedt re: Australian Application No. 2016225278, dated Feb. 4, 2021, 41 pages.
Exhibit SH-1 for Declaration of Dr. Sam Himstedt re: Australian Application No. 2013225278, dated Nov. 16, 2020, 25 pages.
Declaration of Bradley M. Johnson re: Australian Application No. 225278, dated Feb. 8, 2021, 9 pages.
Exhibit BJ-1 for Declaration of Bradley M. Johnson for Australian Application No. 2016225278, dated Feb. 8, 2021, 218 pages.
Declaration of Deok-Kun Oh re: Australian Application No. 2016225288, dated Feb. 10, 2021, 9 pages.
Exhibit DKO-1 for Declaration of Deok-Kun Oh re: Australian Application No. 2016225278, dated Dec. 15, 2020, 87 pages.
Declaration of Dr. Sam Himstedt re: Australian Application No. 2016225278, dated Nov. 16, 2020, 9 pages.
Opposition Evidence of Declarations of Dr. Sam Himstedt and Bradley Johnson with Exhibits, dated Feb. 12, 2021, 1 page.
Opposition Evidence of Declarations of Russell Roger Anderson, Daid R. Dodds, George William John Fleet and Professor Deok-Kun-Oh with exhibits, dated Feb. 12, 2021, 1 pages.
Lin_Wei, Food Chemistry, Shaanxi Science and Technology Press, 1sr Ed., Sep. 1996, p. 52 with translation. 1996.
Animal Microbiology, Henan Agricultural University, China Agricultural Publishing House, 3rd Ed., Jan. 2005, pp. 80-81 with translation.
Kearsley et al., Chapter 5, Physical and Chemical Properties of Glucose Syrups in Kearsley, M.W. and Dziedzic, S.Z. (Eds.), Handbook of Starch Hydrolysis Products and their Derivatives, 1995, 1st Edition, pp. 136-137.
Singh et al., The Role of 5-(Hydroxymehyl)-furfural in the Discoloration of Sugar Solutions, J. Am. Chem. Soc., 1948, vol. 70, No. 2, pp. 517-522.
Hobbs, Chapter 7, "Corn Sweetners" in While, Pamela J and Lawrence A. Johnson (Eds.), Corn: Chemistry and Technology (2nd editio), 2003, pp. 660-661.

"High Fructose Syrups 42 & 55 Quality Guidelines and Analytical Procedures", International Society of Beverage Technologists, Revision 5, 2014, 147 pages.
Certificate of Analysis for Psicose Product, Lot No. CJPS-20141224, issued by CJ Cheiljedang Food Ingredient R&D Center, 2014, 1 page.
Australia Examination Report for Australian Application No. 2016225278, dated Jul. 17, 2019, 4 pages.
Canadian Office Action for Canadian Application No. 2,977,617, dated Feb. 7, 2020, 3 pages.
Canadian Office Action for Canadian Application No. 2,977,617, dated Jun. 4, 2020, 3 pages.
Chinese Office Action for Chinese Application No. 201680011915. X, dated Mar. 10, 2020 with translation, 17 pages.
Japanese Third Party Observations for Japanese Application No. 2017-544758, dated Jun. 9, 2020 with translation, 24 pages.
Japanese Notice of Reasons for Refusal for Japanese Application No. 2017-544758, dated May 26, 2020 with translation, 6 pages.
Japanese Notice of Reasons for Refusal for Japanese Application No. 2017-544758, dated Sep. 17, 2019 with translation, 6 pages.
Taiwanese Office Action for Taiwan Application No. 105105256, dated Nov. 19, 2019 with translation, 11 pages.
Brazilian Preliminary Office Action for Brazilian Application No. 112017017941-5, dated Nov. 13, 2019 with partial translation, 5 pages.
GRAS Notification No. 400, dated Aug. 18, 2011, 109 pages.
Smirnov, V.A., et al., "Stability of monosaccharides in solutions of different pH," Feb. 26, 1957, pp. 849-854, Leningrad Technological Institute of the Food Industry.
Corn Syrup, Saccharides (Liquid Chromatography), Apr. 1, 2009, 5 pages.
Shallenberger, R.S., et al., "Relative stability of glucose and fructose at different acid pH," 1983, pp. 159-165, vol. 12, Food Chemistry.
De Bruijn, J.M., et al., "Alkaline degradation of monosaccharides V*: Kinetics of the alkaline isomerization and degradation of monosaccharides," 1987, pp. 35-43, vol. 106(2), Recueil des Travaux Chimiques des Pays-Bas.
International Search Report for International Application No. PCT/GB2016/050422, mailed May 20, 2016, 3 pages.
International Preliminary Report on Patentability and Written Opinion for International Application No. PCT/ GB2016/050422, issued Aug. 29, 2017, 7 pages.
Third Party Observation for International Application No. PCT/GB2016/050422, dated Jan. 23, 2017, 16 pages.
GRAS Notice (GRN) No. 498, Jun. 12, 2014, 63 pages.
Freedom, Sulphur Dioxide in Foods and Beverages: Its use as a Preservative and its Effect on Asthma, British Journal of diseases of the Chest, vol. 74, 1980, pp. 128-134.
Dobbs, C.M., et al., "Storage Stability of Tagatose in Buffer Solutions of Various Compositions", Food Research International, vol. 43, No. 1, 2010, pp. 382-386.
Nabors, "Alternative Sweetners", 4th Edition, p. 413.
Oshima et al., "Decrease in the D-Psicose Content of Processed Foods Fortified with a Rare Sugar", Food Science and Technology Reasearch, 2014, vol. 30, No. 2, pp. 415-421.
Binder et al., "Mechanistic Insights on the Conversion of Sugars Into 5-Hydroxymethylfurfural", Energy & Environmental Science, 2010, vol. 3, pp. 765-771.
Mathews et al., "The Stability of Levulose in Aqueous Solutions of Varying pH", Part of Bureau of Standards Journal of Research, 1933, vol. 11, pp. 619-633.
Generics UK Ltd (t/a Mylan) v. Yeda Research and Development Co. Ltd, 2017, 56 pages.
Australian Third Party Observations for Australian Application No. 2016225218, dated Feb. 19, 2016, 13 pages.
Australian Third Party Observations for Australian Application No. 2016225278, dated May 8, 2018, 9 pages.
European Third Party Observations for European Application No. 16708198.3, dated Feb. 19, 2016, 14 pages.
European Communication for European Application No. 16708198. 3, dated Oct. 5, 2018, 4 pages.

(56) References Cited

OTHER PUBLICATIONS

Great Britain Examination Report for GB Appplication No. 1507032.9, dated Sep. 10, 2018, 3 pages.
Great Britain Examination Report for GB Application No. 1507032.9, dated May 13, 2019, 3 pages. 2019.
Great Britain Third Party Observations for Great Britain Application No. 1507032.9, 7 pages, dated Jun. 28, 2019.
Great Britain Third Party Observations for Great Britain Application No. 1507032.9, dated Apr. 24, 2015, 6 pages.
Third Party Observations for Japanese Application No. 2017-544758, dated Feb. 4, 2019 with translation, 19 pages.
Baek, S.H., et al., "Maillard Browning Reaction of D-Psicose as Affected by Reaction Factors", Food Science and Biotechnology, 2008, vol. 17, No. 6, pp. 1349-1351.
Handbook of Food Products Manufacturing (2007)(book), 3 pages.
Russell, N.J., Food Preservatives, Second Edition, 2003, 18 pages, (book).
GB Combed Search and Examination Report for GB Application No. GB1507032.9, dated Oct. 16, 2015, 6 pages.
Declaration of Deok-Kun Oh re: Australian Application No. 2016225278, dated Dec. 15, 2020, 8 pages.
Exhibit DKO-4 for Decltion of Deok-Kun Oh re: Australian Application No. 2016225278, dated Feb. 10, 2021, 185 pages.
Exhibit SH-5 for Samuel Himstedt Declaration re: Australian Application No. 225278, dated Feb. 4, 2021, 138 pages.
Opposition Evidence of Declarations of Russell Roger Anderson, David R. Dodds, Goerge William John Fleet and Professor Deok-Kun Oh with Exhibits, dated Febraury 12, 2021, 1 pages.
Entire patent prosecution history of U.S. Appl. No. 15/552,944, filed Aug. 23, 2017, entitled "Allulose Syrups".
Hui et al.; "Handbook of Food Products Manufacturing, Principles, Bakery, Beverages, Cereals, Cheese, Confectionary, Fats, Fruits, and Functional Foods"; p. 430, 2007, John Wiley & Sons, Inc., 3 pages.
Second Declaration of Deok-Kun Oh re: Australian Application No. 2016225288, dated Feb. 10, 2021, 9 pages.
Nabors; "Alternative Sweetners," Specifications and Analysis, Alternatives and Analysis. 4th ed., 2012, pp. 412-413.
Hebeda; Chapter 17 of Corn: Chemistry and Technology, 1987,St. Paul, Minn., USA, pp. 514-534, 13 pages.
Exhibit DKO-7 of Third Declaration for Deok-Kun Oh, re: Australian Application No. 2016225278, dated Apr. 1, 2022, 346 pages.
Fructose Product Brochure of Nippon Foods Chemicals Co. Ltd., with translation, Dec. 2008, 35pages.
Belitz et al., "Food Chemistry", translation from the Fourth German Edition by M.M. Burghagen, D. Hadziyev, P. Helles, S. Jordan and C. Sprinz, Second Edition, 1999, 4 pages.
Clarke, Syrups Encyclopedia of Food Science, Technology and Nutrition, 2003, 7 pages.
Dakal et al., "Adaptive Response and Tolerance to Sugar and Salt Stress in the Food Yeast Zygosaccharomyces Rouxii", International Journal of Food Microbiology, 2014, vol. 185, pp. 140-157.
Declaration of Brian T. Pohrte Pursuant to 37 C.F.R. 1.132, dated Mar. 17, 2022, 12 pages.
Exhibit DRD-9 for Second Decaration of David R. Dodds, re: Australian Application No. 2016225278, dated Apr. 2, 2022, 2 pages.
Exhibit GF-9 for Second George William John Fleet Declaration re: Australian Application No. 2016225278, dated Mar. 31, 2022, 73 pages.
Exhibit RRA-3-1 for Third Declaration for Russell Roger Anderson (Redacted) re Australian Application No. 2016225278, dated Mar. 31, 2022, 36 pages.
Gaonkar et al., Ingredient Interactions Effects on Food Quality Taylor & Francis Group, 2005, 5 pages.
Ikeda et al., "Dielectric Relaxation and Water Activity in Aqueous Solution of D-Psicose", Japan Journal of Food Engineering, 2011, vol. 12, No. 2, pp. 67-74.
Japanese Argricultural Standards for Isomerized Liquid Sugar and Sugar Mixed Isomerized Liquid Sugar, Ministry of Agriculture, Forestry fisheries and Notification, No. 208 with translation, 2021, 16 pages.
Kato et al., "Mechanisms of Browning Degradation of D-Fructose in Special Comaprison with D-Glucose-Glycine Reaction", Agr. Biol. Chem, 1969, vol. 33, No. 6, pp. 939-948.
Long et al., "Separation of D-Psicose and D-Fructose Using Simulated Moving Bed Chromatography", J. Sep. Sci., 2009, vol. 32, pp. 1987-1995.
Macallister et al., "Fructose and High Fructose Corn Syrup", Avi Publishing Co., 1978, 4 pages.
Matsuo et al.. , "The Effects of 90-Day Feeding of D-Psicose Syrup in Male Wistar Rats", Journal of Preventative Medicine, 2011, vol. 1, No. 2, pp. 66-71.
Macdonald, "Stability of Dextrose Solutions of Varying pH", Journal of Research of the National Bureau of Standards, 1950, vol. 45. No. 3, 4 pages.
Membre et al., "Combined Effects of pH and Sugar on Growth Rate of Zygosaccharomyes roouxii, a Bakery Product Spoilage Yeast", Applied an Environmental Microbiology, 1999, vol. 65, No. 11, pp. 4921-4925.
Wagner Doctoral Thesis Integration of Biocathalysis and Simulated Moving Bed Chromatography for the High-Yield Production of Rare Sugars, 2014, 147 pages.
Declaration of Brian Timothy Pohrte re: Australian Application No. 2016225278, dated Oct. 25, 2021, 8 pages.
Preedy, "Processing and Impact on Active Components in Food", Academic Press, 2015, 4 pages.
Raisi et al., "Effects of Influence Parameters on Color Formation in Glucose Syrups During Storage", Amirkabir, 2010, vol. 42, No. 2, 5 pages.
Ranken et al., "Food Industries Manual", 23rd Edition, 1993, 3 pages.
Results of Standard Survey on Japanese Agricultural and Forestry Standards for Isomerized Fructose and Sugar Mixed Isomerized Fructose, Incorporated Administrative Agency, 11 pages.
Roos, "Water Activity—Effect on Food Stability", Encyclopedia of Food Science and Nutrition, 2003, 8 pages.
Saccharides (Gas Liquid Chromatography) Anal. Method. of the Member Companies of the Corn Refiners Assoc., Inc., 1967, 7 pages.
Second Declaration of David R. Dodds re: Australian Application No. 2016225278, dated Apr. 2, 2022, 4 pages.
Second Declaration of George William John Fleet re: Australian Application No. 2016225278, dated Mar. 31, 2022, 14 pages.
Second Declaration of Bradley M. Johnson re: Australian Application No. 2016225278, dated Mar. 30, 2022, 3 pages.
Sikorski, "Chemical and Functional Properties of Food Components", Taylor & Francis Group, 2007, 3 pages.
Declaration of Abigail Storms re: Australian Application No. 2016225278, dated Oct. 15, 2021, 11 pages.
Suez Degremont Water Handbook, 2 pages.
Takeshita et al., "Mass Production of D-Psicose from D-Fructose by a Continuous Bioreactor System Using Immobilized D-Tagatose 3-Epimerase", Journal of Bioscience and Bioengineering, 2000, vol. 90, No. 4, pp. 453-455.
Third Declaration for Russell Roger Anderson (redacted) re: Australian Application No. 2015225278, dated Mar. 31, 2022, 10 pages.
Third Declaration for Deok-Kun Oh re: Australian Application No. 2016225278, dated Apr. 1, 2022, 14 pages.
Tokuoka et al., "Minimum Water Activities for the Growth of Yeasts Isolated From High-Sugar Foods", J. Gen. Appl. Microbiol., 1991, vol. 37, pp. 111-119.
Watson et al., "Corn Chemistry and Technology", St. Paul American Association of Cereal Chemists, Inc., 1987, 14 pages.
Declaration for Katie Lan Wei re: Australian Application No. 2016225278, dated Apr. 4, 2022, 2 pages.
Declaration for John S. White re: Australian Application No. 2016225278, dated Oct. 30, 2021, 62 pages.
White Technical Research Group, Pathogens Food Safety Information Papers, CRA, 2001, 7 pages.

(56) References Cited

OTHER PUBLICATIONS

Yasumatsu et al., "Stabilities of Enzymes in Polyhydric Alcohols", Agr. Biol. Chem., 1954, vol. 29, No. 7, pp. 665-671.
Oshima et al., "Factors Affecting Psicose Formation in Food Products During Cooking", Food Science and Technology Research, 2014, vol. 20, No. 2, pp. 423-430.
Flowers et al., "7.1: Acid-Base Buffers", LibreTexts. 10 pages.
Baek, "Physicochemical Characterization and Weight Reduction Effects of D-Psicose", Dissertation from the Graduate School of Hanyang University, 2008, 134 pages.
Ingredion Statement of Grounds & Particulars of Opposition of Australian Application No. 2016225278, dated Feb. 10, 2021, 24 pages.
ADM (Archer-Daniels-Midland Company) Statement of Grounds and Particulars for Australian Application No. 2016225278, dated Sep. 11, 2020, 17 pages.
Decision of IP Australia in the Matter of the Opposition by Samyang Corp. and Archer Daniels Midland Company to Tate & Lyle's Australian Application No. 2016225278, dated Jun. 28, 2023, 27 pages.
Summary of Oral Submissions—Ingredion for Australian Application No. 2016225278, dated Mar. 17, 2023, 53 pages.
Summary of Oral Submissions—Samyang Corp. and Archer Daniels Midland Company for Australian Application No. 2016225278, dated Mar. 16, 2023, 73 pages.
Exhibit KLW-1 of Katie Lan Wei Declaration re: Australian Application No. 2016225278, dated Apr. 4, 2022, 3 pages.
Experimental Report; no author, no date (1 page).
Office Action in KR 10-2021-7023575, with English translation, mailed Dec. 28, 2025; 18 pages.

\* cited by examiner

ALLULOSE SYRUPS

CROSS-REFERENCE TO RELATED APPLICATIONS

This application a continuation of U.S. application Ser. No. 15/552,944, filed Aug. 23, 2017, which is the U.S. national phase of International Application No. PCT/GB2016/050422, filed Feb. 19, 2016, which claims priority from U.S. Provisional Application No. 62/168,337, filed May 29, 2015, and U.S. Provisional Application No. 62/120,165, filed Feb. 24, 2015, the entire disclosures of each of which are incorporated herein by reference for all purposes.

FIELD OF THE INVENTION

The present invention relates to allulose syrups, use of allulose syrups in the manufacture of food or beverage products, and food and beverage products made using the allulose syrups.

BACKGROUND OF THE INVENTION

Many food and beverage products contain nutritive sweeteners such as sucrose (generally referred to as 'sugar' or 'table sugar'), glucose, fructose, corn syrup, high fructose corn syrup and the like. Although desirable in terms of taste and functional properties, excess intake of nutritive sweeteners, such as sucrose, has long been associated with an increase in diet-related health issues, such as obesity, heart disease, metabolic disorders and dental problems. This worrying trend has caused consumers to become increasingly aware of the importance of adopting a healthier lifestyle and reducing the level of nutritive sweeteners in their diet.

In recent years, there has been a movement towards the development of replacements for nutritive sweeteners, with a particular focus on the development of low or zero-calorie sweeteners. One proposed alternative to nutritive sweeteners is allulose (also known as D-psicose). Allulose is known as a "rare sugar", since it occurs in nature in only very small amounts. It provides around 70% of the sweetness of sucrose, but only around 5% of the calories (approximately 0.2 kcal/g). It may therefore essentially be considered to be a 'zero calorie' sweetener.

In view of its scarcity in nature, production of allulose relies on the epimerization of readily available fructose. Ketose-3-epimerases can interconvert fructose and allulose, and various ketose-3-epimerases are known for carrying out this conversion.

U.S. Pat. No. 8,030,035 and PCT publication no. WO2011/040708 disclose that D-psicose can be produced by reacting D-fructose with a protein derived from *Agrobacterium tumefaciens*, and having psicose 3-epimerase activity.

US patent publication no. 2011/0275138 discloses a ketose 3-epimerase derived from a microorganism of the *Rhizobium* genus. This protein shows a high specificity to D- or L-ketopentose and D- or L-ketohexose, and especially to D-fructose and D-psicose. This document also discloses a process for producing ketoses by using the protein.

Korean patent no. 100832339 discloses a Sinorhizobium YB-58 strain which is capable of converting fructose into psicose (i.e. allulose), and a method of producing psicose using a fungus body of the Sinorhizobium YB-58 strain.

Korean patent application no. 1020090098938 discloses a method of producing psicose using *E. coli* wherein the *E. coli* expresses a polynucleotide encoding a psicose 3-epimerase.

Allulose is present in processed cane and beet molasses, steam treated coffee, wheat plant products and high fructose corn syrup. D-allulose is the C-3 epimer of D-fructose and the structural differences between allulose and fructose result in allulose not being metabolized by the human body to any significant extent, and thus having "zero" calories. Thus, allulose is thought to be a promising candidate as a replacement for nutritive sweeteners and as a sweet bulking agent, as it has essentially no calories and is reported to be sweet while maintaining similar properties to sucrose.

A convenient product form for allulose is an allulose syrup, i.e. a syrup comprising allulose and water. It has been found that allulose syrups may be susceptible to degradation over time (i.e. gradual reduction in allulose content), to color formation, to the formation of impurities (such as hydroxymethylfurfural—HMF), to crystallization, and to inadequate microbial stability.

An object of the present invention is to provide an allulose syrup that addresses the above problems.

SUMMARY OF THE INVENTION

According to a first aspect, the present invention provides an allulose syrup having a total dry solids content of from 50% to 80% by weight, and comprising allulose in an amount of at least 80% by weight on a dry solids basis, wherein the pH of the syrup is from 2.5 to 6.0.

In an embodiment, the allulose syrup has a total dry solids content of from 50% to 70% by weight, and comprises allulose in an amount of at least 80% by weight on a dry solids basis, wherein the pH of the syrup is from 2.5 to 6.0.

In an embodiment, the allulose syrup has a total dry solids content of from 70% to 80% by weight, and comprises allulose in an amount of at least 90% by weight on a dry solids basis, wherein the pH of the syrup is from 3.0 to 5.0.

In an embodiment, the total dry solids content of the allulose syrup is from 71% to 78% by weight. In another embodiment, the total dry solids content of the allulose syrup is from 71% to 73% by weight. In another embodiment, the total dry solids content of the allulose syrup is from 76% to 78% by weight. In another embodiment, the total dry solids content of the allulose syrup is from 50% to 71% by weight.

In an embodiment, the pH of the allulose syrup is from 3.5 to 4.5. In an embodiment, the pH of the allulose syrup is from 3.8 to 4.2.

In an embodiment, the allulose syrup comprises allulose in an amount of at least 95% by weight on a dry solids basis.

In an embodiment, the allulose syrup comprises less than 1000 ppm of HMF.

In an embodiment, the allulose syrup comprises sulfur dioxide in an amount of from 0.1 to ppm.

In an embodiment, the allulose syrup comprises sulfur dioxide in an amount of from 1 to 20 ppm.

In an embodiment, the allulose syrup comprises less than 10 parts per billion of isovaleraldehyde.

In an embodiment, the allulose syrup comprises less than 2 parts per billion of 2-aminoacetophenone.

In an embodiment, the allulose syrup further comprises one or more additives. In an embodiment, the one or more additives may include a stability-enhancing additive. In an embodiment, the one or more additives may include an anti-oxidant. In an embodiment, the one or more additives may include a buffer. In an embodiment, the one or more additive may be selected from the group consisting of ascorbic acid or salts thereof; isoascorbic acid (erythorbate)

or salts thereof; citric acid or salts thereof; acetic acid or salts thereof; salts of bisulfite or metabisulfite; and tocopherol acetate.

In an embodiment, the shelf-life of the allulose syrup as defined by maintaining an allulose content of greater than 80% by weight on a dry solids basis is at least 3, 6, 9, 12 months, or more than 12 months. In other words, an allulose content of greater than 80% by weight on a dry solids basis is maintained when the allulose syrup is stored for at least 3, 6, 9, 12 months, or more than 12 months.

In an embodiment, the shelf-life of the allulose syrup as defined by maintaining an allulose content of greater than 90% by weight on a dry solids basis is at least 3, 6, 9, 12 months, or more than 12 months.

In an embodiment, the shelf-life of the allulose syrup as defined by maintaining an allulose content of greater than 95% by weight on a dry solids basis is at least 3, 6, 9, 12 months, or more than 12 months.

According to a further aspect, the present invention provides a process for preparing an allulose syrup according to the first aspect. The process for preparing the allulose syrup includes:
  providing an allulose syrup;
  adjusting the dry solids content of the allulose syrup such that it is from 50% to 80% by weight;
  adjusting the allulose content of the allulose syrup such that allulose is present in an amount of at least 80% by weight on a dry solids basis; and
  controlling the pH of the allulose syrup so that it is from 2.5 to 6.0.

In an embodiment, the process includes:
  providing an allulose syrup;
  adjusting the dry solids content of the allulose syrup such that it is from 60% to 80% by weight;
  adjusting the allulose content of the allulose syrup such that allulose is present in an amount of at least 80% by weight on a dry solids basis; and
  controlling the pH of the allulose syrup so that it is from 2.5 to 6.0.

In an embodiment, the process includes:
  providing an allulose syrup;
  adjusting the dry solids content of the allulose syrup such that it is from 70% to 80% by weight;
  adjusting the allulose content of the allulose syrup such that allulose is present in an amount of at least 90% by weight on a dry solids basis; and
  controlling the pH of the allulose syrup so that it is from 3.0 to 5.0.

In an embodiment of the process, the dry solids content is from 70 to 78% by weight, the allulose content of the syrup is at least 90% by weight on a dry solids basis, and the pH is controlled to between 3.5 to 4.5.

According to a further aspect, the present invention provides the use of the allulose syrup according to the first aspect in the preparation of a food or beverage product.

According to a further aspect, the present invention provides a food or beverage product comprising an allulose syrup according to the first aspect and at least one additional food or beverage ingredient.

In an embodiment, the at least one additional food or beverage ingredient includes at least one ingredient selected from the group consisting of flavorants, colorants, sweeteners other than allulose, dietary fibers, acidulants, water, and combinations thereof.

In an embodiment, the allulose syrup comprises 50 to 80% dry solids by weight, and greater than 80% allulose on a dry solids basis, a measured pH between 2.5 and 6.0 and a shelf life of at least 3 months.

In an embodiment, the allulose syrup comprises 60 to 80% dry solids by weight, and greater than 90% allulose on a dry solids basis, a measured pH between 3.0 and 5.0 and a shelf life of at least 3 months.

In an embodiment, the allulose syrup comprises 70 to 80% dry solids by weight, and greater than 90% allulose on a dry solids basis, a measured pH between 3.0 and 5.0 and a shelf life of at least 3 months.

DETAILED DESCRIPTION

Figure 1:
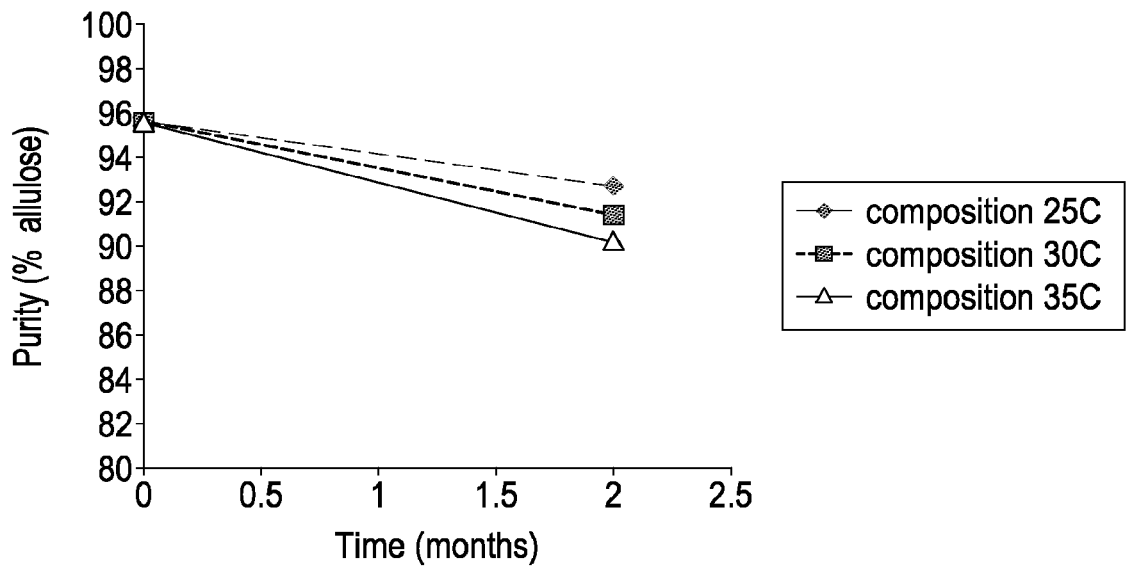
FIG. 1 shows how the purity of an allulose syrup composition (initial pH 3.4) changes over time at 25° C., 30° C. and 35° C.

The present invention is based on the finding that allulose syrups with improved storage stability can be prepared by careful control of certain parameters.

The term "allulose" as used herein refers to a monosaccharide sugar of the structure shown as a Fischer projection in below Formula I. It is also known as "D-psicose":

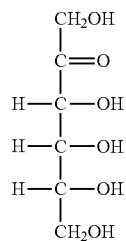

Formula (I)

According to a first aspect, the present invention provides an allulose syrup having a total dry solids content of from 50% to 80% by weight, and comprising allulose in an amount of at least 80% by weight on a dry solids basis, wherein the pH of the syrup is from 2.5 to 6.0.

According to an embodiment, the allulose syrup has a total dry solids content of from 70% to 80% by weight, and comprises allulose in an amount of at least 90% by weight on a dry solids basis, wherein the pH of the syrup is from 3.0 to 5.0.

The total dry solids content of the allulose syrup is from 50% to 80% by weight. For example, the total dry solids content may be 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79% or 80% by weight, as well as all intermediate values.

In an embodiment, the total dry solids content of the allulose syrup is from 70% to 80% by weight. For example, the total dry solids content may be 70%, 71%, 72%, 73%, 74%, 75%, 76%, 77%, 78%, 79% or 80% by weight, as well as all intermediate values. In an embodiment, the total dry solids content of the allulose syrup is from 71% to 78% by weight. In another embodiment, the total dry solids content of the allulose syrup is from 71% to 73% by weight. In another embodiment, the total dry solids content of the allulose syrup is from 76% to 78% by weight.

In another embodiment, the total dry solids content of the allulose syrup is from 50% to 70% by weight.

It has been found that, although the compositional stability of the allulose syrup is generally highest towards the lower end of the total dry solids content range of the invention, microbial stability is generally highest towards the higher end of the total dry solids content range of the invention. Accordingly, the selection of a suitable total dry solids content within the range of the invention can be made depending on the key attribute for the particular application.

The pH of the allulose syrup is from 2.5 to 6.0. For example, the pH of the syrup may be 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9 or 6.0, as well as all intermediate values.

In an embodiment, the pH of the allulose syrup is from 3.0 to 5.0. For example, the pH of the syrup may be 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or 5.0 as well as all intermediate values.

In an embodiment, the pH of the allulose syrup is from 3.5 to 4.5. For example, the pH of the syrup may be 3.5, 3.6, 3.7, 3.8, 3.9, 4.0, 4.1, 4.2, 4.3, 4.4 or 4.5 as well as all intermediate values. In an embodiment, the pH of the allulose syrup is from 3.8 to 4.2. In an embodiment, the pH of the allulose syrup is about 4.0.

It has been found that allulose degradation and HMF formation can be minimized by increasing the pH, but that undesirable color formation is also promoted by increasing the pH. It has been found that the pH according to the present invention is optimal both in terms of minimizing allulose degradation and HMF formation, and minimizing undesirable color formation.

It is surprising that allulose syrups have been found to be most stable in the above range of pH, since monosaccharide syrups have previously been found to be most stable at lower pH, e.g. between 2.2 and 3.0 (Smirnov V, Geispits K; Stability of Monosaccharides in Solutions of Different pH; BioChem. Moscow, 1957, 22:849-854).

The allulose syrup comprises allulose in an amount of at least 80% by weight on a dry solids basis (i.e., of the total dry solids present in the allulose syrup, at least 80% by weight is allulose). For example, the allulose syrup may comprise allulose in an amount of 80%, 81%, 82%, 83%, 84%, 85%, 86%, 87%, 88%, 89%, 90%, 91%, 92%, 93%, 94%, 95%, 96%, 97%, 98%, 99% or 100% by weight on a dry solids basis, as well as all intermediate values.

In an embodiment, the allulose syrup comprises allulose in an amount of at least 90% by weight on a dry solids basis (i.e., of the total dry solids present in the allulose syrup, at least 90% by weight is allulose). For example, the allulose syrup may comprise allulose in an amount of 90%, 91%, 92%, 93%, 94%, 95%, 96%, 97%, 98%, 99% or 100% by weight on a dry solids basis, as well as all intermediate values. In an embodiment, the allulose syrup comprises allulose in an amount of at least 95% by weight on a dry solids basis.

In an embodiment, the allulose syrup comprises less than 1000 ppm of HMF (hydroxymethylfurfural). For example, the allulose syrup may comprise less than 900 ppm, less than 800 ppm, less than 700 ppm, less than 600 ppm, less than 500 ppm, less than 400 ppm, less than 300 ppm, less than 200 ppm or less than 100 ppm of HMF. In certain embodiments, the allulose syrup comprises more than 0.1 ppm and less than 1000 ppm of HMF (hydroxymethylfurfural), for example more than 0.1 ppm and less than 900 ppm, more than 0.1 ppm and less than 800 ppm, more than 0.1 ppm and less than 700 ppm, more than 0.1 ppm and less than 600 ppm, more than 0.1 ppm and less than 500 ppm, more than 0.1 ppm and less than 400 ppm, more than 0.1 ppm and less than 300 ppm, more than 0.1 ppm and less than 200 ppm, or more than 0.1 ppm and less than 100 ppm.

In an embodiment, the allulose syrup comprises sulfur dioxide in an amount of from 0.1 to ppm.

In an embodiment, the allulose syrup comprises sulfur dioxide in an amount of from 1 to 20 ppm.

In an embodiment, the allulose syrup comprises less than 10 parts per billion of isovaleraldehyde.

In an embodiment, the allulose syrup comprises less than 2 parts per billion of 2-aminoacetophenone.

In an embodiment, the allulose syrup further comprises one or more additives. In an embodiment, the one or more additives may include a stability-enhancing additive. In an embodiment, the one or more additives may include an anti-oxidant. In an embodiment, the one or more additives may include a buffer. The incorporation of a buffer in the allulose syrup maintains the pH of the allulose within the desired range for a longer period of time, such that storage stability is further enhanced. In an embodiment, the stability enhancing additives are included at around 0.01-2.0% by weight based on the total weight of the allulose syrup.

In an embodiment, the stability-enhancing additive may be selected from the group consisting of ascorbic acid and salts thereof; isoascorbic acid (erythorbate) and salts thereof; citric acid and salts thereof; acetic acid and salts thereof; and salts of bisulfite and metabisulfite; and tocopherol acetate. In the case of salts, suitable salts include alkali metal salts, particularly sodium and potassium salts, and especially sodium salts. Specific examples of stability-enhancing additives useful in the present invention include ascorbate, isoascorbate, sodium citrate, sodium acetate, tocopherol acetate and metabisulfite. In an embodiment, the stability enhancing additives are included at around 0.2% by weight based on the total weight of the allulose syrup in the case of ascorbic acid or salts thereof; isoascorbic acid (erythorbate) or salts thereof; citric acid or salts thereof; acetic acid or salts thereof; and tocopherol acetate. In an embodiment, the stability enhancing additives are included at around 0.02% by weight based on the total weight of the allulose syrup in the case of salts of bisulfite or metabisulfite.

The concentration of buffer included in the allulose syrup may be around 0.01-2.0% by weight based on the total weight of the allulose syrup. The concentration of buffer included in the allulose syrup may be around 0.2% by weight based on the total weight of the allulose syrup in the case of ascorbic acid or salts thereof; isoascorbic acid (erythorbate) or salts thereof; citric acid or salts thereof; acetic acid or salts thereof; and tocopherol acetate. The concentration of buffer included in the allulose syrup may be around 0.02% by weight based on the total weight of the allulose syrup in the case of salts of bisulfite or metabisulfite.

The allulose syrup of the present invention has a shelf-life of at least 3 months. In particular, the allulose syrup of the present invention maintains an allulose content of at least 80% on a dry solids basis for at least 3 months, preferably at least 6 months, at least 9 months, at least 12 months or more than 12 months.

The allulose syrup of the present invention has a shelf-life of at least 3 months. In particular, the allulose syrup of the present invention maintains an allulose content of at least 90% on a dry solids basis for at least 3 months, preferably at least 6 months, at least 9 months, at least 12 months or more than 12 months.

The allulose syrup of the present invention preferably has a shelf-life of at least 6 months. In particular, the allulose syrup of the present invention preferably maintains an allulose content of at least 95% on a dry solids basis for at least 6 months, preferably at least 9 months, at least 12 months or more than 12 months. Allulose content is measured by standard HPLC methods such as the Sacch.03 method set forth by the corn refiners association (http://corn.org/wp-content/uploads/2009/12/SACCH.03.pdf).

Preferred ranges for the dry solids include 60-80%, 70-80%, 71-78%, 71-73% or 76-78%. Preferred pH ranges are between 3.5 and 4.5 or between 3.8 and 4.2. Preferred allulose content is greater than 95% allulose on a dry solids basis. Preferably, the syrup has a limited amount of the following compounds: less than 1000 ppm hydroxymethylfurfural (HMF); sulphur dioxide at a concentration of less than 20 parts per million; isovaleraldehyde at a measured concentration of less than 10 parts per billion; and 2-aminoacetophenone at a concentration of less than 2 parts per billion. Optionally, the syrup can have any of the following compounds alone or in combination thereof: a stability enhancing ingredient including one or more of: 1) ascorbic acid or salts thereof, 2) isoascorbic acid (erythorbate) or salts thereof, 3) citric acid or salts thereof, 4) acetic acid or salts thereof, 5) salts of bisulfite or metabisulfite, and/or 6) tocopherol acetate. The allulose syrup may have a concentration of greater than 90% (e.g. greater than 95%) with a shelf-life of at least 3, 6, 9, 12 months, or more than 12 months.

According to a further aspect, the present invention provides a process for preparing an allulose syrup. The process comprises: providing an allulose syrup; adjusting the dry solids content of the allulose syrup such that it is from 50% to 80% by weight; adjusting the allulose content of the allulose syrup such that allulose is present in an amount of at least 80% by weight on a dry solids basis; and controlling the pH of the allulose syrup so that it is from 2.5 to 6.0.

According to an embodiment, the process for preparing an allulose syrup comprises: providing an allulose syrup; adjusting the dry solids content of the allulose syrup such that it is from 60% to 80% by weight; adjusting the allulose content of the allulose syrup such that allulose is present in an amount of at least 80% by weight on a dry solids basis; and controlling the pH of the allulose syrup so that it is from 2.5 to 6.0.

According to an embodiment, the process for preparing an allulose syrup comprises: providing an allulose syrup; adjusting the dry solids content of the allulose syrup such that it is from 70% to 80% by weight; adjusting the allulose content of the allulose syrup such that allulose is present in an amount of at least 90% by weight on a dry solids basis; and controlling the pH of the allulose syrup so that it is from 3.0 to 5.0.

According to an embodiment, the process for preparing an allulose syrup comprises: providing an allulose syrup; adjusting the dry solids content of the allulose syrup such that it is from 70% to 78% by weight; adjusting the allulose content of the allulose syrup such that allulose is present in an amount of at least 90% by weight on a dry solids basis; and controlling the pH of the allulose syrup so that it is from 3.5 to 4.5.

The process optionally comprises removing or avoiding the production of HMF to limit the content to less than 1000 ppm, or more preferably less than 100 ppm. The process optionally comprises removing or avoiding the production of isovaleraldehyde to limit the content to less than 10 parts per billion. The process optionally comprises removing or avoiding the production of aminoacetophenone to limit the content to less than 2 parts per billion. The process optionally comprises adding one or more additives to the syrup. These procedures need not be carried out in the same order recited above (for example, the pH adjustment may be performed before adjustment of the dry solids content).

The description of the embodiments of the allulose syrup herein applies *mutatis mutandis* to the process for preparing an allulose syrup.

According to a further aspect, the present invention provides the use of the allulose syrup according to the first aspect in the preparation of a food or beverage product, as well as food or beverage products made using the sweetener syrup.

Food or beverage products which may be contemplated in the context of the present invention include baked goods; sweet bakery products (including, but not limited to, rolls, cakes, pies, pastries, and cookies); pre-made sweet bakery mixes for preparing sweet bakery products; pie fillings and other sweet fillings (including, but not limited to, fruit pie fillings and nut pie fillings such as pecan pie filling, as well as fillings for cookies, cakes, pastries, confectionary products and the like, such as fat-based cream fillings); desserts, gelatins and puddings; frozen desserts (including, but not limited to, frozen dairy desserts such as ice cream—including regular ice cream, soft serve ice cream and all other types of ice cream—and frozen non-dairy desserts such as non-dairy ice cream, sorbet and the like); carbonated beverages (including, but not limited to, soft carbonated beverages); non-carbonated beverages (including, but not limited to, soft non-carbonated beverages such as flavored waters and sweet tea or coffee based beverages); beverage concentrates (including, but not limited to, liquid concentrates and syrups as well as non-liquid 'concentrates', such as freeze-dried and/or powder preparations); yogurts (including, but not limited to, full fat, reduced fat and fat-free dairy yogurts, as well non-dairy and lactose-free yogurts and frozen equivalents of all of these); snack bars (including, but not limited to, cereal, nut, seed and/or fruit bars); bread products (including, but not limited to, leavened and unleavened breads, yeasted and unyeasted breads such as soda breads, breads comprising any type of wheat flour, breads comprising any type of non-wheat flour (such as potato, rice and rye flours), gluten-free breads); pre-made bread mixes for preparing bread products; sauces, syrups and dressings; sweet spreads (including, but not limited to, jellies, jams, butters, nut spreads and other spreadable preserves, conserves and the like); confectionary products (including, but not limited to, jelly candies, soft candies, hard candies, chocolates and gums); sweetened breakfast cereals (including, but not limited to, extruded (kix type) breakfast cereals, flaked breakfast cereals and puffed breakfast cereals); and cereal coating compositions for use in preparing sweetened breakfast cereals. Other types of food and beverage product not mentioned here but which conventionally include one or more nutritive sweetener may also be contemplated in the context of the present invention.

An allulose syrup in accordance with the present invention may be used in combination with one or more other food or beverage ingredients, including any of the food and beverage ingredients known in the art. Such additional food and beverage ingredients include, but are not limited to, flavorants, colorants, sweeteners other than allulose (including other sugars such as sucrose, fructose, allose, tagatose and other rare sugars, synthetic high intensity sweeteners such as sucralose, acesulfame K, saccharin, aspartame and the like, natural high intensity sweeteners such as Stevia and Monk Fruit Extract sweeteners and the terpene glycosides present therein, and the like), dietary fibers (including soluble dietary fibers such as soluble corn fiber and polydextrose), acidulants, water, and the like.

Specific illustrative examples of food and beverage products which may be prepared using an allulose syrup in accordance with the invention include, but are not limited to:

a beverage, such as a carbonated or non-carbonated beverage or a juice drink comprising allulose syrup and one or more synthetic high intensity sweeteners such as sucralose;

a beverage, including a beverage concentrate, comprising an allulose syrup, a natural high intensity sweetener (such as a Stevia sweetener), and a dietary fiber (e.g., a soluble dietary fiber, such as a soluble corn fiber), and an acidulant (e.g., citric acid);

a yogurt, such as a Greek yogurt, comprising allulose syrup (which may be free of any artificial sweeteners);

a frozen dessert, comprising allulose syrup, a dietary fiber (e.g., a soluble dietary fiber, such as a soluble corn fiber), a natural high intensity sweetener (such as a Stevia sweetener and/or a Monk Fruit Extract sweetener), and a food system stabilizer;

a cookie, such as a chocolate chip cookie, comprising an allulose syrup and a corn starch;

a confectionary, such as a gummy candy, comprising an allulose syrup and a natural high intensity sweetener (e.g., a Stevia sweetener); and a flavored syrup, such as a maple-flavored syrup, comprising an allulose syrup, fructose, and an acidulant (e.g., citric acid).

EXAMPLES

The invention will now be further described and illustrated by means of the following examples, it being understood that these are intended to explain the invention, and in no way to limit its scope.

Summary

It was determined from stability experiments that allulose syrup produced at one set of conditions has a more rapid purity degradation than allulose syrup produced at another set of conditions (Example 1). The main difference between these syrups was initial pH. An accelerated stability study (Example 2) was carried out with pH values around the narrow range of predicted stability and also with additives and at different % dry solids. It was determined that 71-77% dry solids and a pH of around 3.8 to 4.2 provided optimum storage stability. Microbial stability was also investigated (Example 2). The allulose syrup was very stable at 77% and less stable at 72%. The results could be used to predict a low limit on microstability of 60% DS. Another stability study was carried out at ambient storage temperatures with pH values and dry solids content around the ranges of predicted stability (Example 3). Finally, a more detailed study of additives with respect to stability at two different dry solids levels and optimal pH was carried out (Example 4). Some of the additives reduced the change in color, composition and HMF.

Example 1

Each sample consisted of 3500 mL of allulose syrup in a 4 quart (4.54 liter) square plastic container. The sampling was carried out at 0 and 2 months.
Analytical Samples were analyzed using methods known to those skilled in the art. The allulose composition was determined by standard HPLC methods, such as the Sacch.03 method set forth by the corn refiners association (http://corn.org/wp-content/uploads/2009/12/SACCH.03.pdf). DS was measured by refractive index, pH was measured at a dilution resulting in less than 40% solids, color was analyzed by measuring the absorbance of the syrup at 450 nm and subtracting the background at 600 nm and dividing the result by the path length of the cuvette. HMF, isovaleraldehyde, aminoacetophenone, were analyzed using reverse phase HPLC with UV detection.

The purity of the allulose composition dropped significantly in the course of 2 months, as shown in FIG. 1. There was a clear trend that higher temperature resulted in a greater change in composition.

Figure 2:
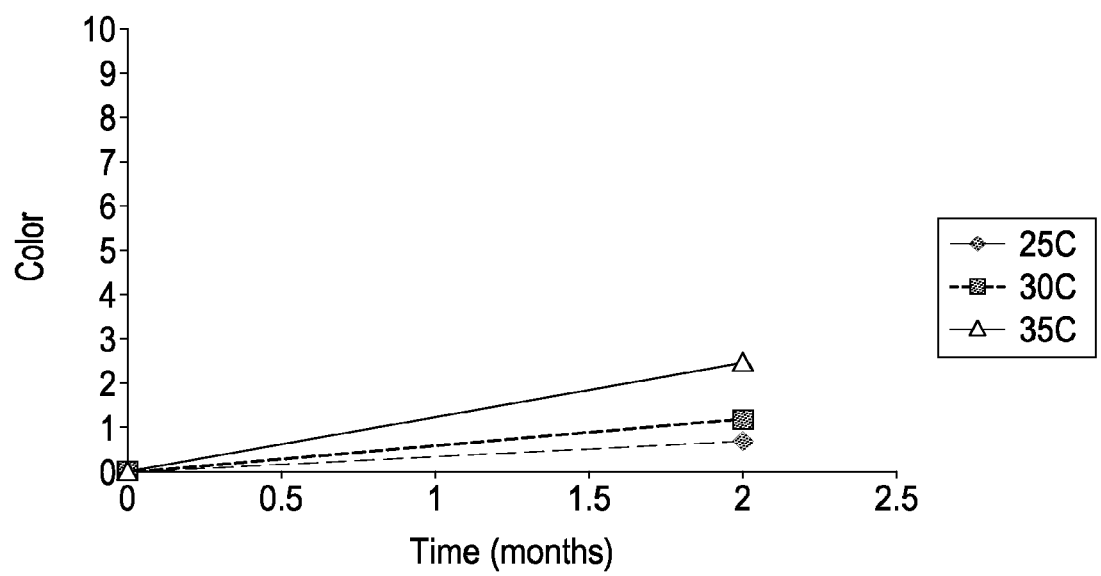
FIG. 2 shows how the color of an allulose syrup composition (initial pH 3.4) changes over time at 25° C., 30° C. and 35° C.

Changes in color were minor (FIG. 2). At 35° C. the syrup did increase in color more rapidly. However, at 25 and 30° C., the color change was minimal and did not exceed 2.

Figure 3:
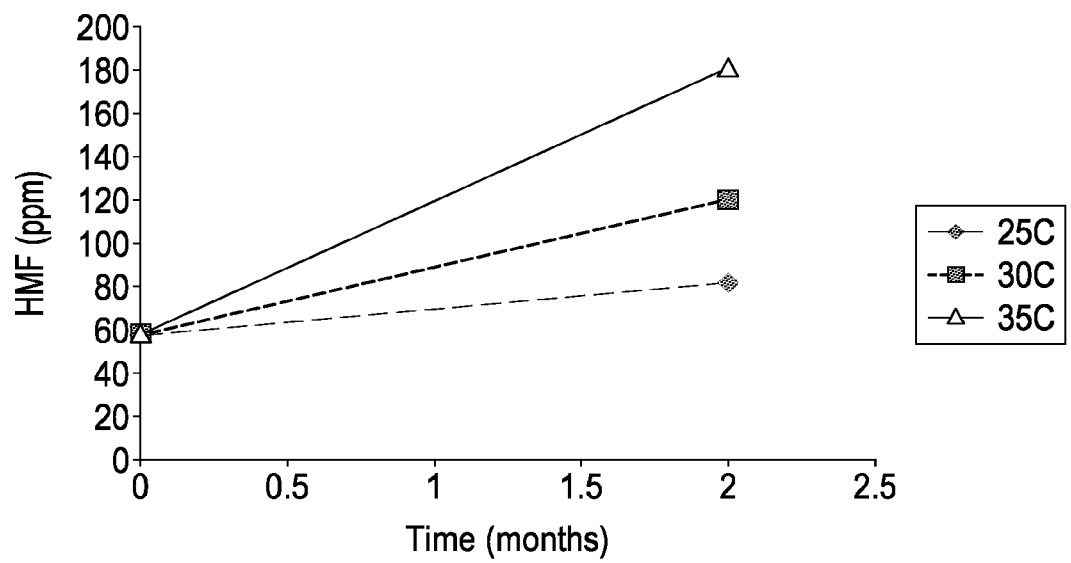
FIG. 3 shows how the amount of HMF in an allulose syrup composition (initial pH 3.4) changes over time at 25° C., 30° C. and 35° C.

The HMF content increased in each sample over 2 months (FIG. 3). The content of HMF in the sample at 35° C. increased to 180 ppm HMF after 2 months. The content of HMF in the 25° C. and 30° C. samples was lower.

The pH value decreased similarly over 2 months for each sample. It is noteworthy that the pH started lower in this prepared material than previously studied material which started at a pH of 4.0 and which had improved stability, as discussed below.

Figure 4:
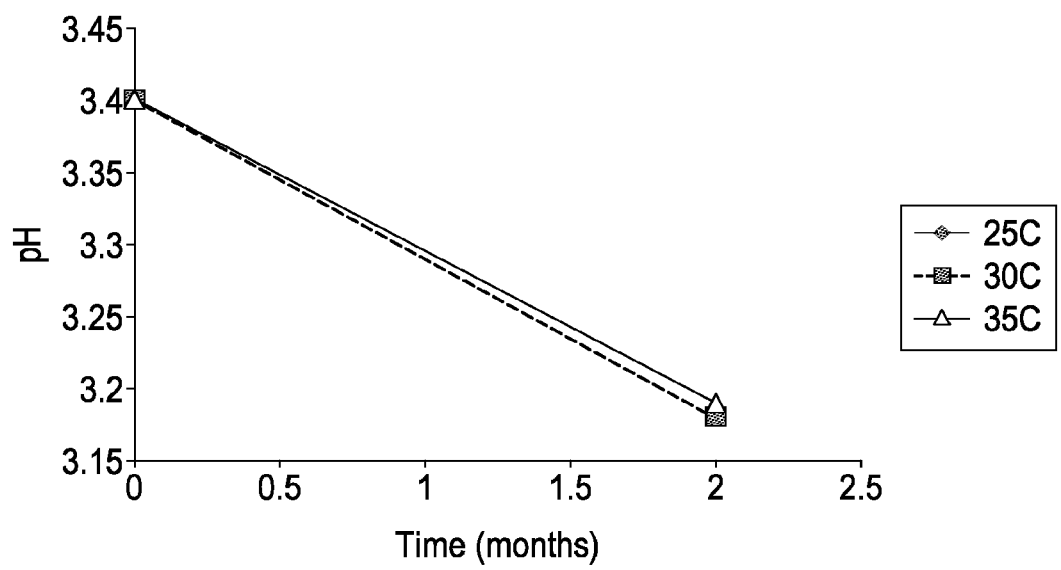
FIG. 4 shows how the pH of an allulose syrup composition (initial pH 3.4) changes over time at 25° C., 30° C. and 35° C. It should be noted that the data points for storage at 25° C. are the same as for storage at 30° C.
Figure 5:
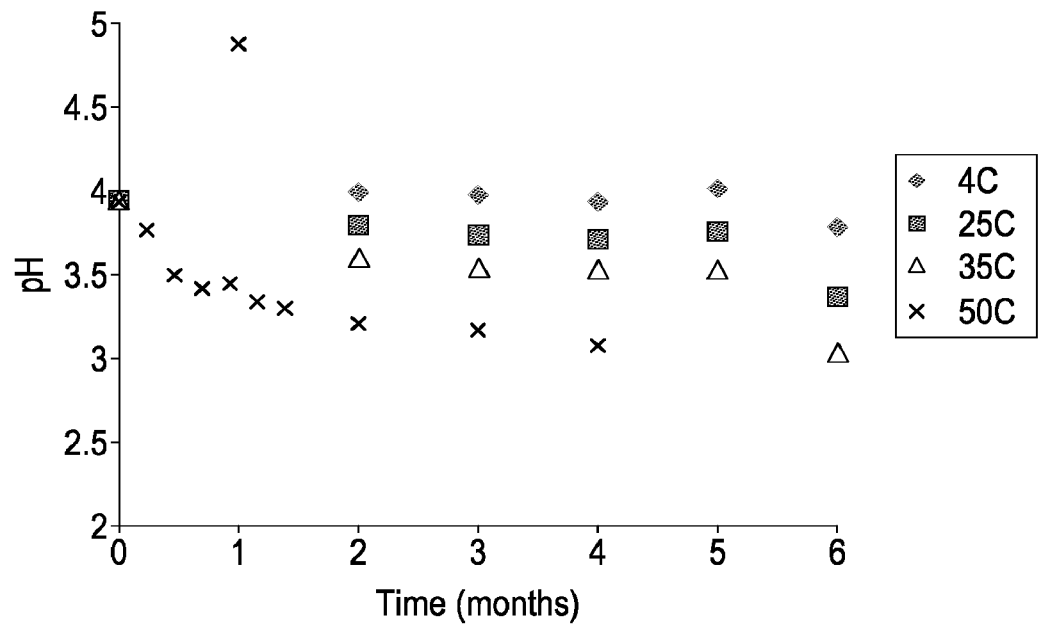
FIG. 5 shows how the pH of an allulose syrup composition (initial pH 4.0) changes over time at 4° C., 25° C., 35° C. and 50° C.
Figure 6:
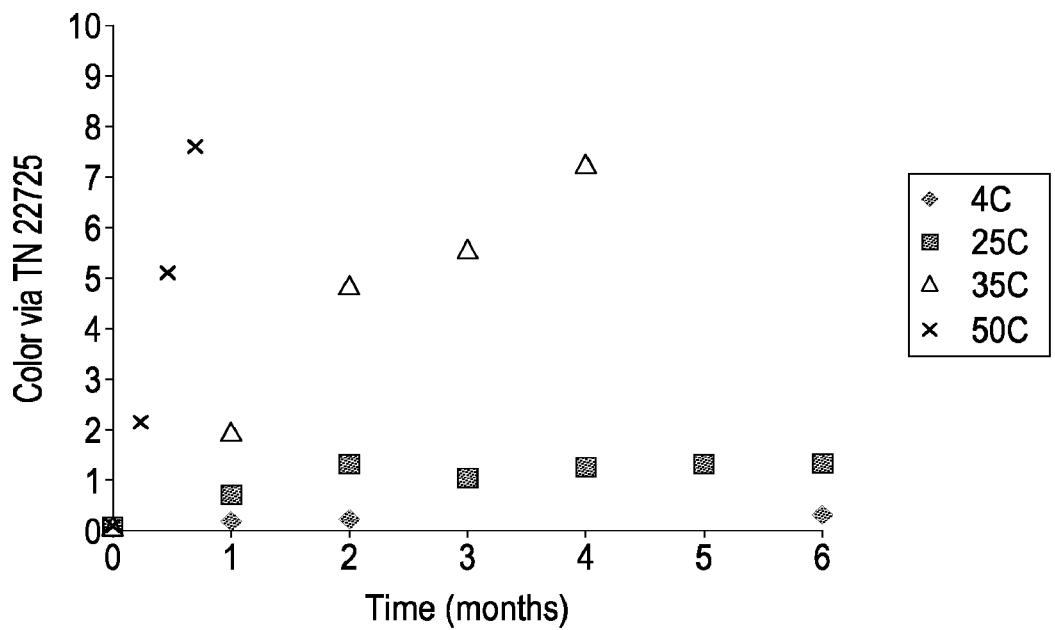
FIG. 6 shows how the color of an allulose syrup composition (initial pH 4.0) changes over time at 4° C., 25° C., 35° C. and 50° C.
Figure 7:
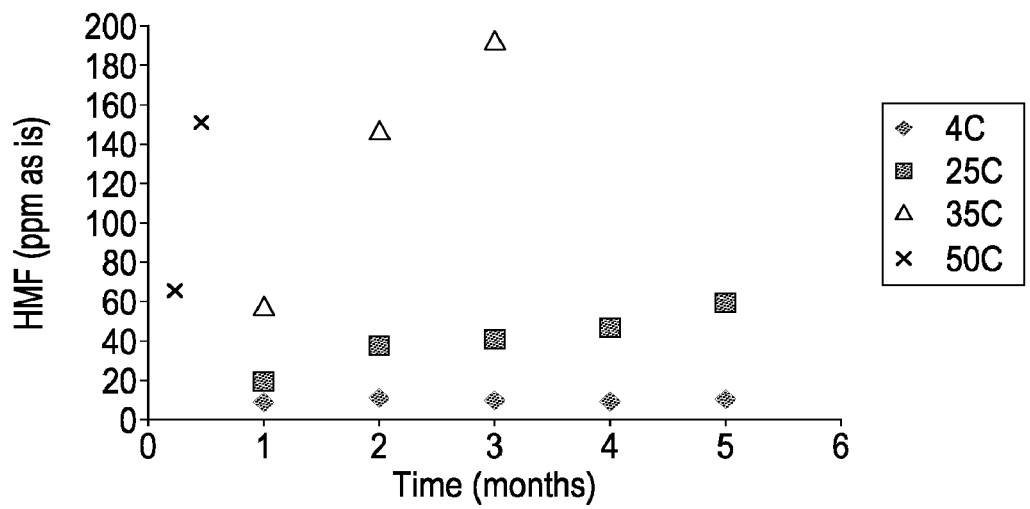
FIG. 7 shows how the amount of HMF in an allulose syrup composition (initial pH 4.0) changes over time at 4° C., 25° C., 35° C. and 50° C.
Figure 8:
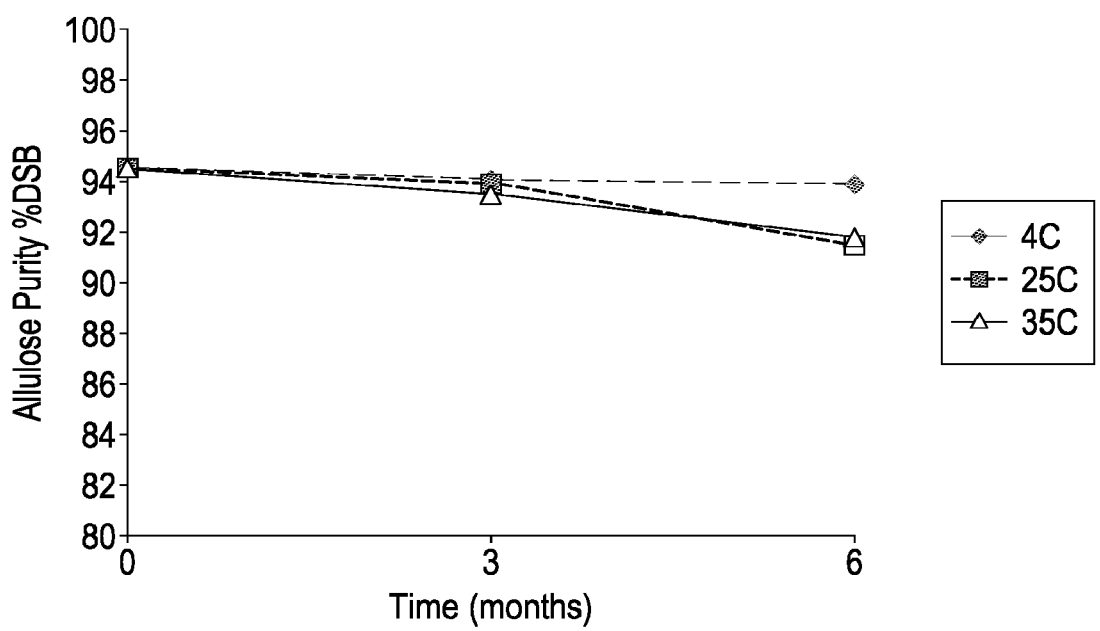
FIG. 8 shows how the purity of an allulose syrup composition (initial pH 4.0) changes over time at 4° C., 25° C. and 35° C.

The main difference in composition between the two products is an initial pH difference of approximately 0.6 pH units. Additionally, pH in the first study remained above pH 3.5 for the first 5 months at 4° C., 25° C. and 35° C. (FIG. 5), whereas, in the second study, pH was always below 3.5 (FIG. 4). Color development (FIG. 2) was lower in the second study at 25° C. for two months (0.67) compared to the first study (FIG. 6) at the same time and temp (1.32).

TABLE 1

Carbohydrate profiles for allulose syrup stored in Railcars at an initial pH of 3.4

| | Date | Allulose Content |
|---|---|---|
| Original load out | Oct. 26, 2014 | 95.42 |
| After railcar storage | Jan. 21, 2015 | 93.42 |
| Difference | | −2.00 |

The allulose content change seen during the lower pH stability storage study was additionally confirmed in the bulk product in railcars (Table 1). The compositional changes were slightly less at 3 months in railcars, than two months at 25° C. in the storage study (i.e. 2% in 3 months vs. 3% in 2 months). The effect of container volume was demonstrated in another example as well, when 300 gallon totes were less susceptible to allulose content changes than 1 quart containers. A likely explanation may be that pH is more stable in larger containers as the surface area to volume ratio is smaller. An alternative explanation could be that the average temperature was lower in the larger containers, but this was not directly observed.

In summary, the allulose content of the syrup prepared having an initial pH of 3.4 changed within 2 months. The allulose content of the syrup prepared having an initial pH of 4.0 also changed over time, but at a slower rate (FIGS. 5-8). The primary physical difference in those two syrups appears to be pH. Additional examples below demonstrate that pH has a large effect on compositional stability.

Example 2—Storage Stability

Final allulose syrup product samples were subjected to a range of pH and different DS and temperatures. Another series of samples had sodium metabisulfite and sodium citrate added. Separate sub samples were taken at predetermined intervals and their carbohydrate composition, color, HMF, DS and pH analyzed.

TABLE 2

Sample carbohydrate profile

| | Dextrose % | Fructose % | Allulose % | Others % | pH | Nominal DS % |
|---|---|---|---|---|---|---|
| Campaign 1 Product | 0.5 | 2.2 | 93.0 | 4.3 | 3.4 | 77.0 |

TABLE 3

Nominal screening experiments to be run.

| pH | Temp ° C. | DS % | Additive |
|---|---|---|---|
| 3.4 | 40 | 77 | — |
| 3.4 | 50 | 77 | — |
| 3.4 | 40 | 71 | — |
| 3.4 | 50 | 71 | — |
| 3.5 | 40 | 77 | — |
| 3.5 | 50 | 77 | — |
| 4.0 | 40 | 77 | — |
| 4.0 | 50 | 77 | — |
| 4.0 | 40 | 77 | Sodium citrate |
| 4.0 | 50 | 77 | Sodium citrate |
| 4.0 | 40 | 77 | Sodium metabisulfite |
| 4.0 | 50 | 77 | Sodium metabisulfite |
| 4.5 | 40 | 77 | — |
| 4.5 | 50 | 77 | — |

Methods

Samples of starting material were taken. The pH and DS were measured and recorded. One sub sample of each was taken as is, the next adjusted to pH 3.6, another to pH 4.0 and the final one to pH 4.7 using dilute HCl or sodium carbonate. One subset of starting material was diluted to 71% DS. Another subset of the pH 4.0 batch had sodium citrate or sodium metabisulfite added. Sealed sample containers were placed into different temperature ovens at 40° C. and 50° C. Extracts from each of the samples were removed from each oven periodically. Samples were chilled quickly in an ice bath and analyzed for carbohydrate composition, HMF, color and pH.

Analytical

Samples were analyzed to determine their DS, pH, carbohydrate composition, HMF content and color. For pH and color the samples were analyzed at a standard DS.

Figure 9:
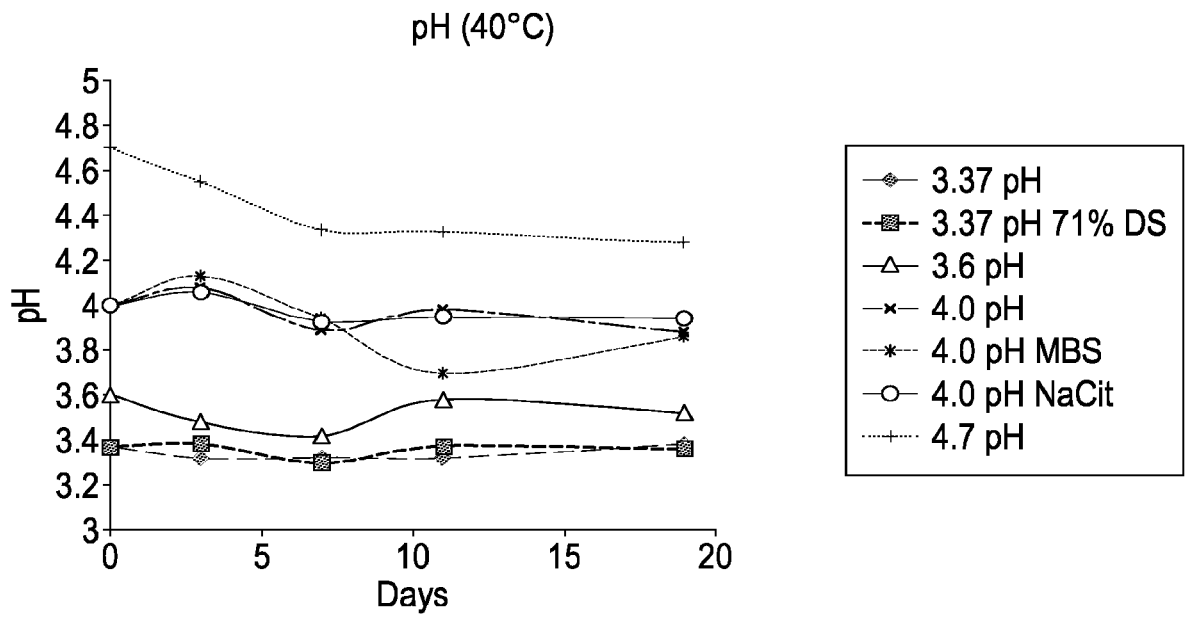
FIG. 9 shows how the pH of the allulose syrup product samples of Example 2 changes over time at 40° C.
Figure 10:
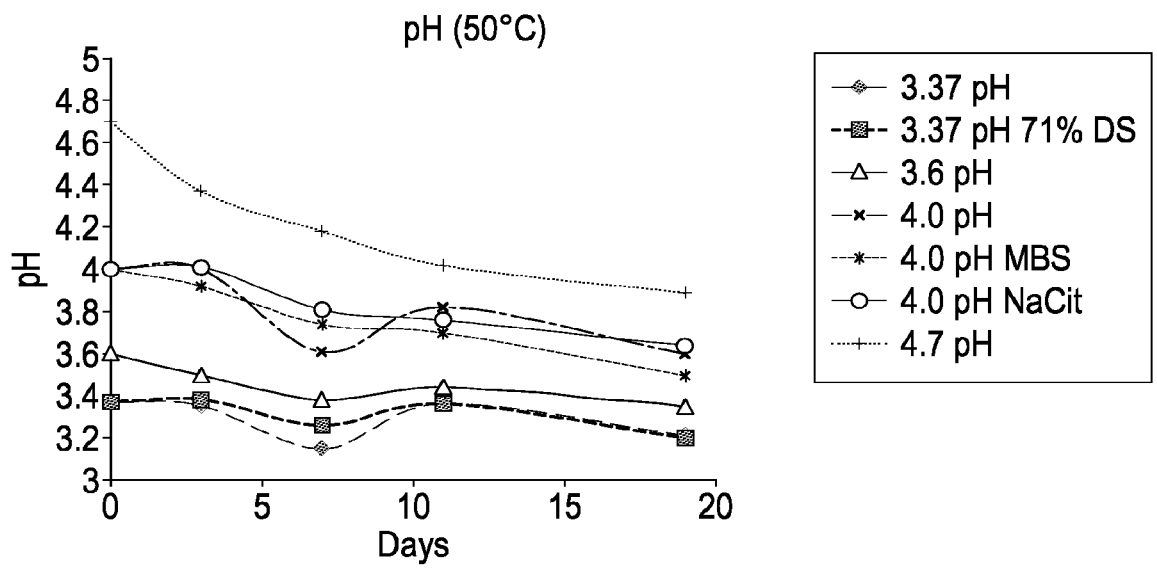
FIG. 10 shows how the pH of the allulose syrup product samples of Example 2 changes over time at 50° C.

In general, pH dropped over the course of the experiments, see FIG. 9 and FIG. 10. The decrease in pH is more pronounced in samples starting at higher pH, and the pH drops faster at higher temperature. It appears that the pH of each sample becomes more stable around a value near 3.0 to 3.3.

Two of the samples that were adjusted to start at pH 4.0 had additives added. The first was with 75 ppm sodium metabisulfite (MBS) and the second was 60 ppm sodium citrate (NaCit).

Figure 11:
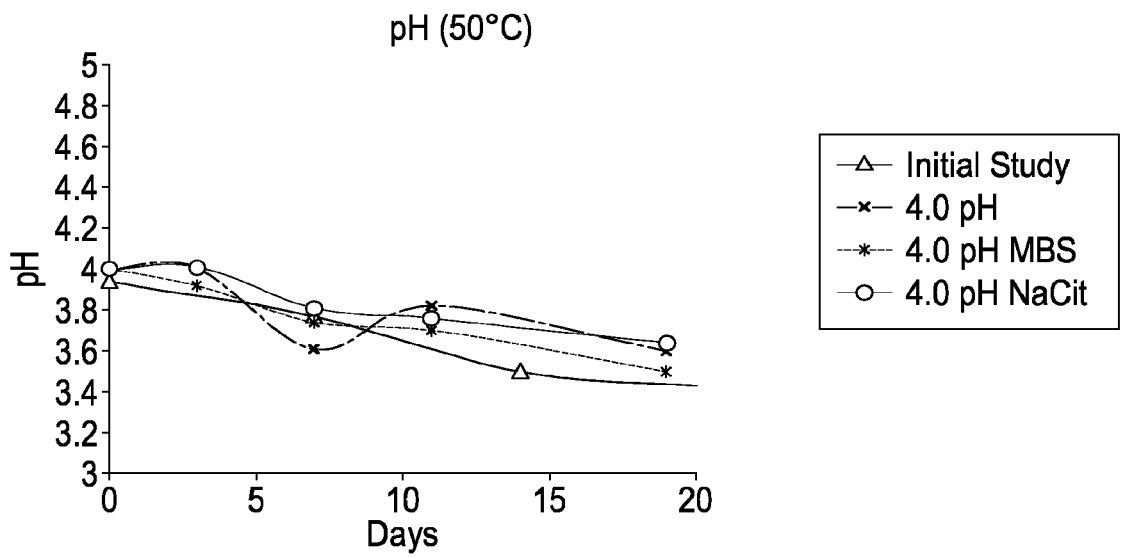
FIG. 11 compares change in the pH of the allulose syrup product samples of Example 2 (starting pH 4.0) at 50° C. with an allulose syrup composition with an initial pH of 3.9.

The pH drift data (FIGS. 9 and 10) at pH 4.0 matches the stability study of an allulose syrup product which the product pH started at 3.9 and samples were stored at 50° C. (comparison in FIG. 11).

Figure 12:
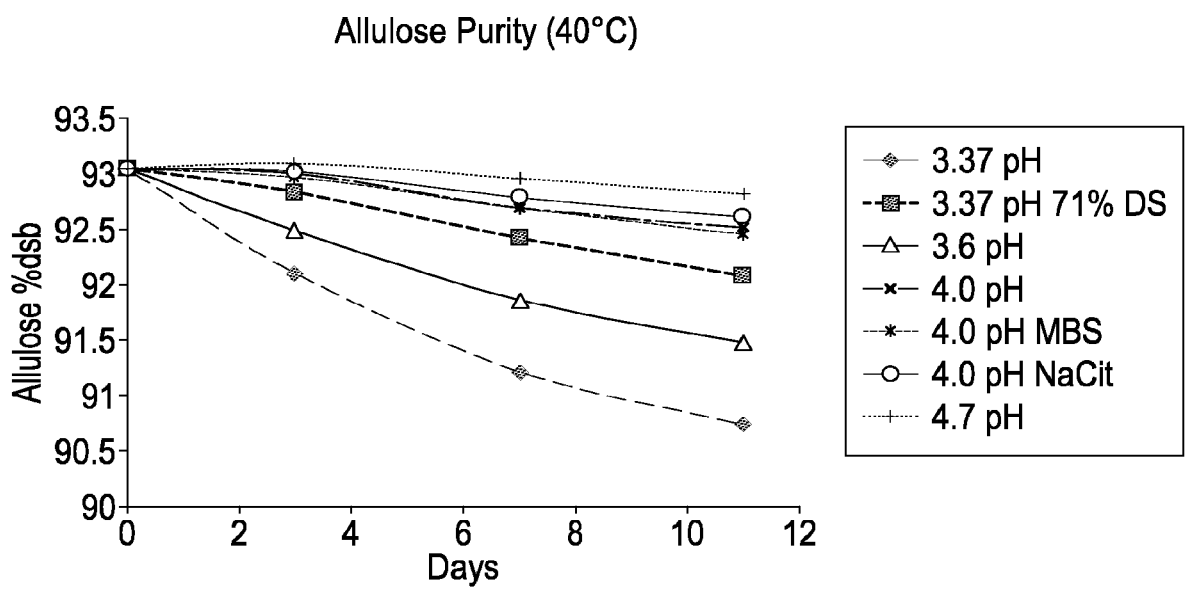
FIG. 12 shows how the allulose purity of the allulose syrup product samples of Example 2 changes over time at 40° C.
Figure 13:
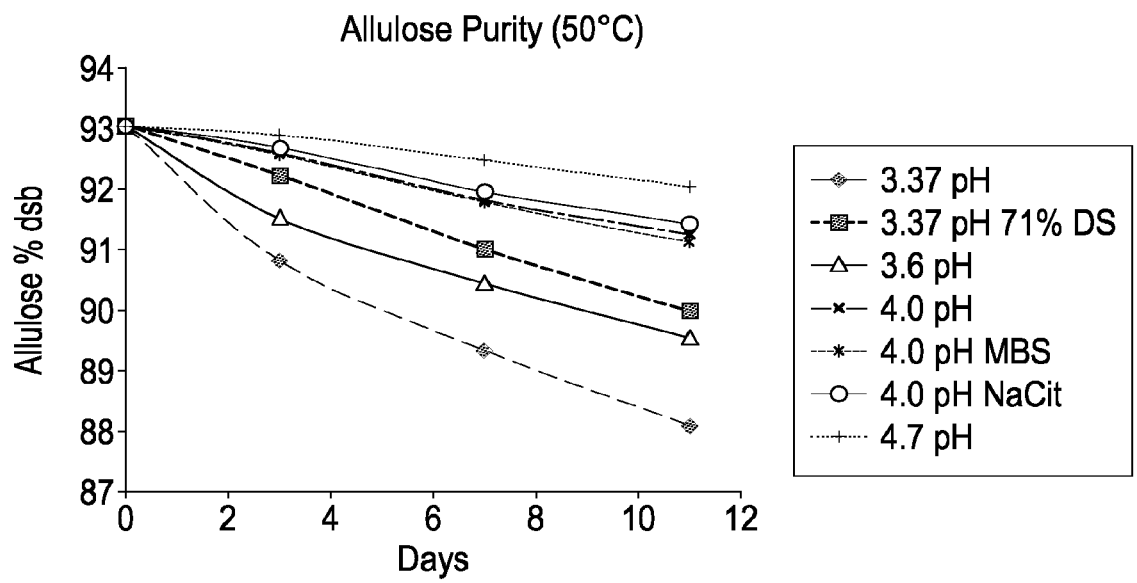
FIG. 13 shows how the allulose purity of the allulose syrup product samples of Example 2 changes over time at 50° C.

Allulose content dropped in all samples following the trend of higher temperature, lower pH and longer time resulting in faster allulose losses (FIGS. 12 and 13). The pH 4.0 samples with additives show a similar rate of allulose loss as the pH 4.0 sample with no additive. This may be explained by the similar pH changes observed above and due to very low levels of the additives.

Surprisingly, the sample with only a slightly lower DS, (71% vs. 77%) starting at pH 3.37 showed much less allulose loss than its equivalent pH sample at 77% DS. The rate of allulose loss at 71% DS was approximately half that at 77% DS, demonstrating that a narrow range of DS has a dramatic and unexpected effect on allulose syrup stability. Similar effects are not observed for similar monosaccharide syrups such as glucose or high fructose corn syrups within such a narrow range of DS.

Figure 14:
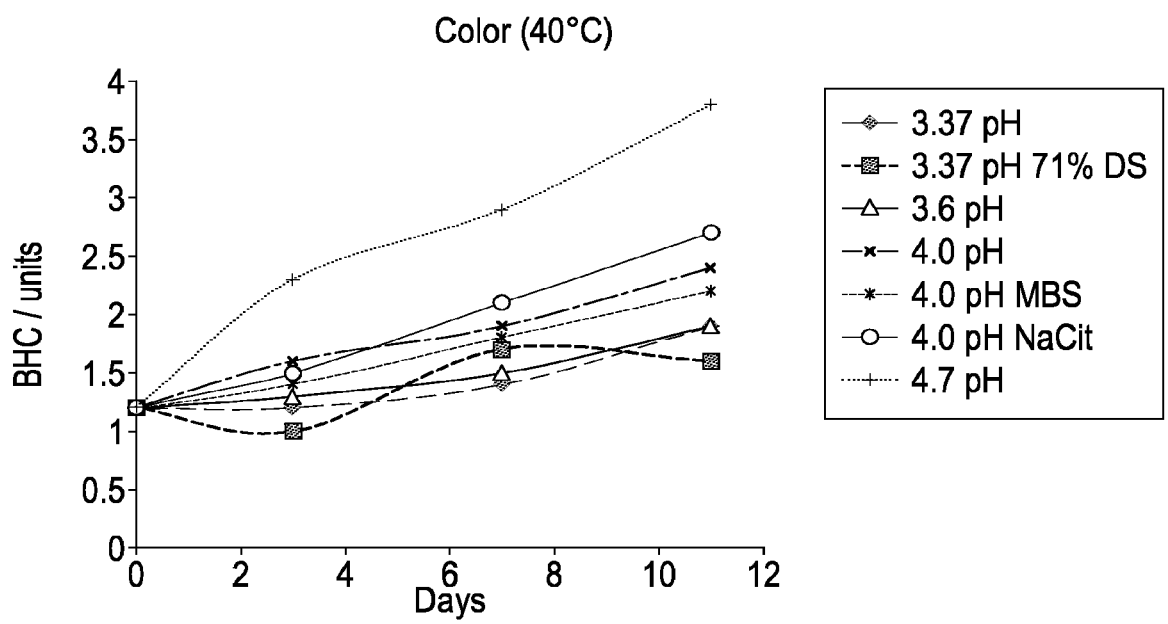
FIG. 14 shows how the color of the allulose syrup product samples of Example 2 changes over time at 40° C.
Figure 15:
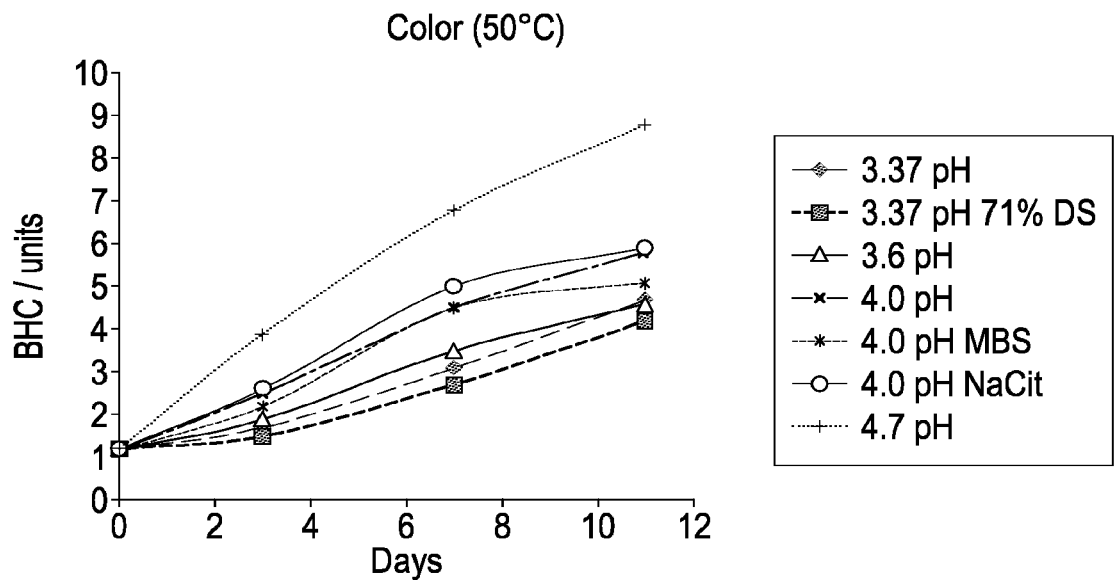
FIG. 15 shows how the color of the allulose syrup product samples of Example 2 changes over time at 50° C.

Color was measured and plotted against time (FIGS. 14 and 15). High pH, longer time and high temperature increased the color formation. By increasing the pH it is possible to mitigate the allulose content loss, however there is an upper limit bound by increasing color in the final product. This results in a surprisingly narrow pH range being acceptable for long term storage of allulose syrup. This range appears to be between pH 3.5 and 4.5 when both color and composition stability are considered. Similar effects are not observed for similar monosaccharide syrups such as glucose or high fructose corn syrups within such a narrow range of pH.

Figure 16:
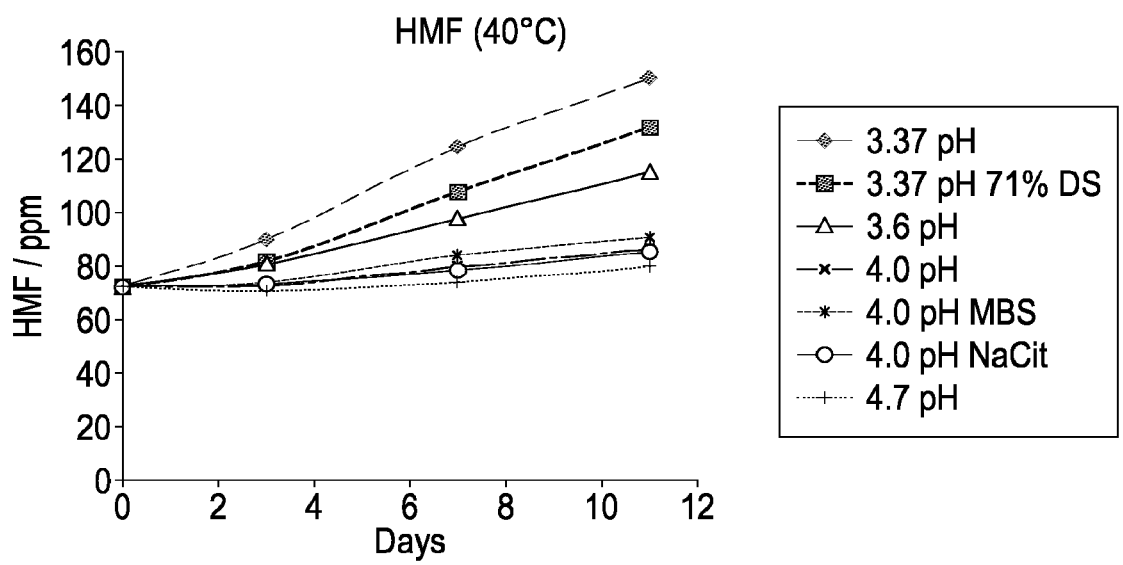
FIG. 16 shows how the HMF content of the allulose syrup product samples of Example 2 changes over time at 40° C.
Figure 17:
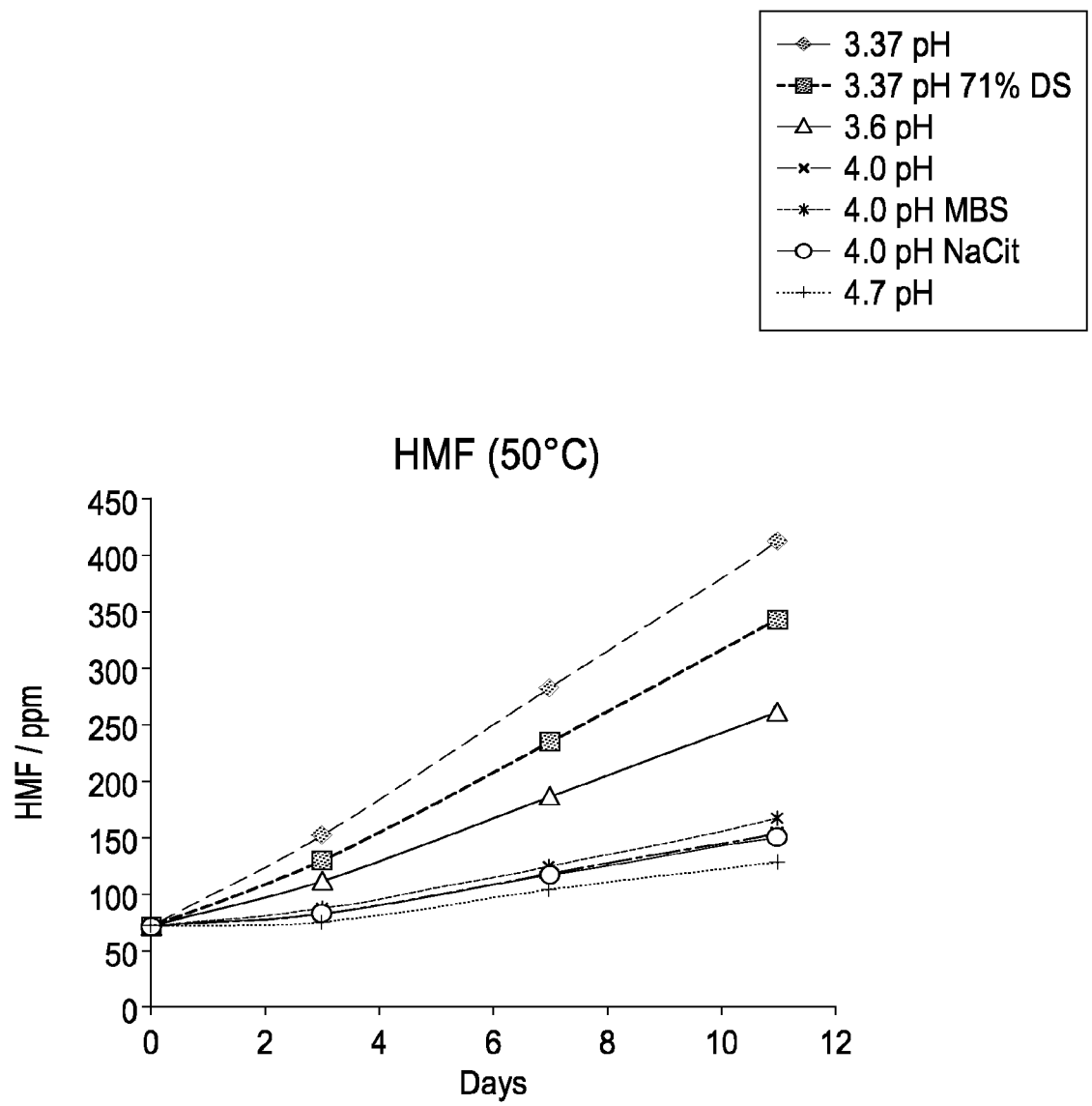
FIG. 17 shows how the HMF content of the allulose syrup product samples of Example 2 changes over time at 50° C.

The change in HMF over time for these samples is shown in FIGS. 16 and 17. Low pH, high temperature and longer time contributed to increased HMF formation.

Example 3—Crystallization Stability

Allulose syrups were prepared at 50, 60, 71, 77, and 85% DS and were equilibrated at 25° C., 15° C. and 4° C. These samples were seeded with ~0.1% crystalline allulose and crystallization was monitored visually and by change in dry solids of the syrup fraction after 1 month of storage.

Results:

Change in DS is shown in Table 4. A change in DS greater than 0 indicates crystallization, and a larger number indicates a larger amount of crystallization. At 25° C., 77% DS and below did not crystalize substantially, although seed crystals also did not dissolve at 77% DS, suggesting 77% is near the limit of solubility at 25° C. The 85% DS sample did crystallize. At 15° C., 71% DS and below samples did not crystalize, while 77% and 85% did have crystal formation. At 4° C., 60% DS and below samples did not crystalize, while the 71% DS sample had very minor crystallization that did not appreciably affect the bulk syrup DS. Therefore, for storage of a crystallization stable syrup at ambient and reduced temperatures, 77% solids or less is desirable. For cool (<25° C.) temperatures, 71% solids or less is more desirable.

TABLE 4

Crystallization Stability: Change in DS

|  | 2 weeks | 4 weeks |
| --- | --- | --- |
| 4° C. | | |
| 50% ds | 0 | 0 |
| 60% ds | 0 | 0 |
| 71% ds | 0 | 0 |
| 77% ds | 5 | 5 |
| 85% ds | 9 | 9 |
| 15° C. | | |
| 50% ds | 0 | 0 |
| 60% ds | 0 | 0 |
| 71% ds | 0 | 0 |
| 77% ds | 2 | 2 |
| 85% ds | 7 | 8 |
| 25° C. | | |
| 50% ds | 0 | 0 |
| 60% ds | 0 | 0 |
| 71% ds | 0 | 0 |
| 77% ds | 0 | 0 |
| 85% ds | 5 | 6 |

Example 4—Microbial Stability

Microbial stability was assessed at 72% and 77% dry solids content by a challenge study with osmophilic yeasts and molds.

An aliquot of 250 grams of each DS level control sample was placed into two sterile glass jars (250 grams×2 for each moisture level, total 4 containers). An aliquot of 1,000 grams of each DS level sample was placed into two sterile Nalgene containers (1,000 grams×2 for each DS level, total 4 containers). Each 1,000 gram sample (8 containers total) was inoculated with osmophilic mold and yeast separately (less than 1% of total volume). The containers were mixed and incubated at room temperature for 2-3 hours to equilibrate the inoculum. Then, 250 grams of the mixture was placed into a 250 mL sterile glass jar to make triplicates for each testing condition (24×250 mL glass jars). An initial sample for plating (T=0) was taken and incubation started at 25 and 35° C. Samples were then taken at intervals as planned for plating.

At 77% DS osmophilic yeasts and molds were rapidly made non-viable. However at 72% DS, allulose syrup took 4 weeks to completely kill all viable yeasts and molds at 25° C.

Microbial stability was also assessed at 50% and 60% dry solids content by a challenge study with osmophilic yeasts and molds using the same method. At 60% DS, it took allulose syrup 2 months to completely remove viability of osmophilic yeasts and molds, and at 50% DS, viability of yeasts and molds was not removed completely even after 4 months. This suggests that 60% solids is the minimum solids concentration for allulose syrup that can reasonably be considered resistant to spoilage by microbial contamination and more ideally the concentration is 70-77% solids.

Based on the findings in Tables 5a-e below and those in the crystallization and reactivity examples above, final product stability has an optimum DS that is fairly narrow for allulose syrup. Lower DS reduces the rate of degradation in all parameters, however a final product DS that is below 60% DS does not maintain good microbial stability. Higher DS results in more rapid degradation and also crystallization. Therefore an optimal DS of 60-80% is required and more preferably a DS of 71-78% is required for long term stability of allulose syrup and more preferably a DS of 71-73% should have the highest combined allulose content stability, microbial stability and crystalline stability. In cases where microbial stability is the key attribute necessary, 76-78% DS would have the best microbial stability. Additionally, final product stability is optimized in a narrow range of pH, from 3.5 to 4.5 and more preferably in a pH range from 3.8 to 4.2 in order to optimize the trade-off between carbohydrate stability and color/HMF formation. Lower pH was shown to increase the rate of allulose content loss and HMF formation, while higher pH was shown to result in more rapid formation of color.

TABLE 5A

| Control samples: One large container (250 mL sterile glass jar) | | | T = 0 May 8, 2014 | | T = 1 w May 15, 2014 | | T = 2 w May 21, 2014 | | T = 4 w Jun. 6, 2014 | |
|---|---|---|---|---|---|---|---|---|---|---|
| DS level (%) | Temp (° C.) | LIMS | Osmo M | Osmo Y | Osmo M | Osmo Y | Osmo M | Osmo Y | Osmo M | Osmo Y |
| 72 | 25 | 372602 | <10 | <10 | <10 | <10 | <10 | <10 | <10 | <10 |
| 72 | 35 | 372603 | <10 | <10 | <10 | <10 | <10 | <10 | <10 | <10 |
| 77 | 25 | 372604 | <10 | <10 | <10 | <10 | <10 | <10 | <10 | <10 |
| 77 | 35 | 372605 | <10 | <10 | <10 | <10 | <10 | <10 | <10 | <10 |

Table 5b

| Experimental Samples: | DS level (%) | Temp (° C.) | LIMS | T = 0 May 8, 2014 | | T = 1 w May 15, 2014 | | T = 2 w May 21, 2014 | | T = 4 w Jun. 6, 2014 | |
|---|---|---|---|---|---|---|---|---|---|---|---|
| | | | | Osmo M | Osmo Y | Osmo M | Osmo Y | Osmo M | Osmo Y | Osmo M | Osmo Y |
| Inoculum: Z.rouxii | 72 | 25 | 372606 | — | 335,000 | — | 425 | — | 55 | — | <10 |
| Replicates: 3 | 72 | 25 | 372607 | — | 312,000 | — | 265 | — | 40 | — | <10 |
| Plating: 12/point | 72 | 25 | 372608 | — | 309,000 | — | 440 | — | 55 | — | <10 |
| Container: 12 | 72 | 35 | 372609 | — | 311,000 | — | <10 | — | <10 | — | <10 |
| Min total vol: | 72 | 35 | 372610 | — | 260,500 | — | <10 | — | <10 | — | <10 |
| 1,800 grams | 72 | 35 | 372611 | — | 290,000 | — | <10 | — | <10 | — | <10 |
| | 77 | 25 | 372612 | — | 317,500 | — | <10 | — | <10 | — | <10 |
| | 77 | 25 | 372613 | — | 301,500 | — | <10 | — | <10 | — | <10 |
| | 77 | 25 | 372614 | — | 299,000 | — | <10 | — | <10 | — | <10 |
| | 77 | 35 | 372615 | — | 277,000 | — | <10 | — | <10 | — | <10 |
| | 77 | 35 | 372616 | — | 279,000 | — | <10 | — | <10 | — | <10 |
| | 77 | 35 | 372617 | — | 287,000 | — | <10 | — | <10 | — | <10 |

Table 5c

| Experimental Samples: | DS level (%) | Temp (° C.) | LIMS | T = 0 May 8, 2014 | | T = 1 w May 15, 2014 | | T = 2 w May 21, 2014 | | T = 4 w Jun. 6, 2014 | |
|---|---|---|---|---|---|---|---|---|---|---|---|
| | | | | Osmo M | Osmo Y | Osmo M | Osmo Y | Osmo M | Osmo Y | Osmo M | Osmo Y |
| Inoculum: Osmo molds | 72 | 25 | 372618 | 2,700 | — | 585 | — | 10 | — | <10 | — |
| Replicates: 3 | 72 | 25 | 372619 | 2,400 | — | 485 | — | <10 | — | <10 | — |
| Plating: 12/point | 72 | 25 | 372620 | 3,050 | — | 590 | — | <10 | — | <10 | — |
| Container: 12 | 72 | 35 | 372621 | 2,250 | — | <10 | — | <10 | — | <10 | — |
| Min total vol: | 72 | 35 | 372622 | 2,300 | — | <10 | — | <10 | — | <10 | — |
| 1,800 grams | 72 | 35 | 372623 | 2,700 | — | <10 | — | <10 | — | <10 | — |
| | 77 | 25 | 372624 | 3,250 | — | 155 | — | <10 | — | <10 | — |
| | 77 | 25 | 372625 | 2,800 | — | 150 | — | <10 | — | <10 | — |
| | 77 | 25 | 372626 | 2,850 | — | 175 | — | <10 | — | <10 | — |
| | 77 | 35 | 372627 | 2,500 | — | <10 | — | <10 | — | <10 | — |
| | 77 | 35 | 372628 | 3,150 | — | <10 | — | <10 | — | <10 | — |
| | 77 | 35 | 372629 | 2,800 | — | <10 | — | <10 | — | <10 | — |

Table 5d

| DS level (%) | Temperature (° F.) | T = 0<br>0 Osmo M | T = 1 w<br>1 Osmo M | T = 2 w<br>2 Osmo M | T = 4 w<br>4 Osmo M | T = 2 m<br>8 Osmo M | T = 3 m<br>13 Osmo M | T = 4 m<br>17 Osmo M | T = 6 m<br>26 Osmo M |
|---|---|---|---|---|---|---|---|---|---|
| 50 | 77 | 6,517 | 1,690 | 417 | 45 | 30 | 40 | 195 | |
| 50 | 95 | 6,817 | 4,233 | 3,167 | 377 | <10 | <10 | <10 | |
| 60 | 77 | 6,683 | 5,033 | 1,117 | 23 | <10 | <10 | <10 | |
| 60 | 95 | 6,450 | 990 | <10 | <10 | <10 | <10 | <10 | |

Table 5e

| DS level (%) | Temperature (° F.) | T = 0<br>0 Osmo Y | T = 1 w<br>1 Osmo Y | T = 2 w<br>2 Osmo Y | T = 4 w<br>4 Osmo Y | T = 2 m<br>8 Osmo Y | T = 3 m<br>13 Osmo Y | T = 4 m<br>17 Osmo Y | T = 6 m<br>26 Osmo Y |
|---|---|---|---|---|---|---|---|---|---|
| 50 | 77 | 319,333 | 11,243 | 125 | <10 | <10 | <10 | <10 | |
| 50 | 95 | 335,000 | 65 | <10 | <10 | <10 | <10 | <10 | |
| 60 | 77 | 312,500 | 393 | 23 | <10 | <10 | <10 | <10 | |
| 60 | 95 | 331,167 | <10 | <10 | <10 | <10 | <10 | <10 | |

Example 5—Allulose Syrup Stability within a Narrow pH Range and Ambient Storage Temperatures This series of experiments was set up to determine allulose syrup stability within a narrow range of pH and DS at ambient temperature range of 25-35° C.

Samples of allulose syrup of 93.8% allulose content were pH adjusted to 3.8, 4.0 and 4.2 pH units and DS adjusted to 77% and 71% and incubated at 25° C. and 35° C. Samples were analyzed periodically.

Results

Figure 18:
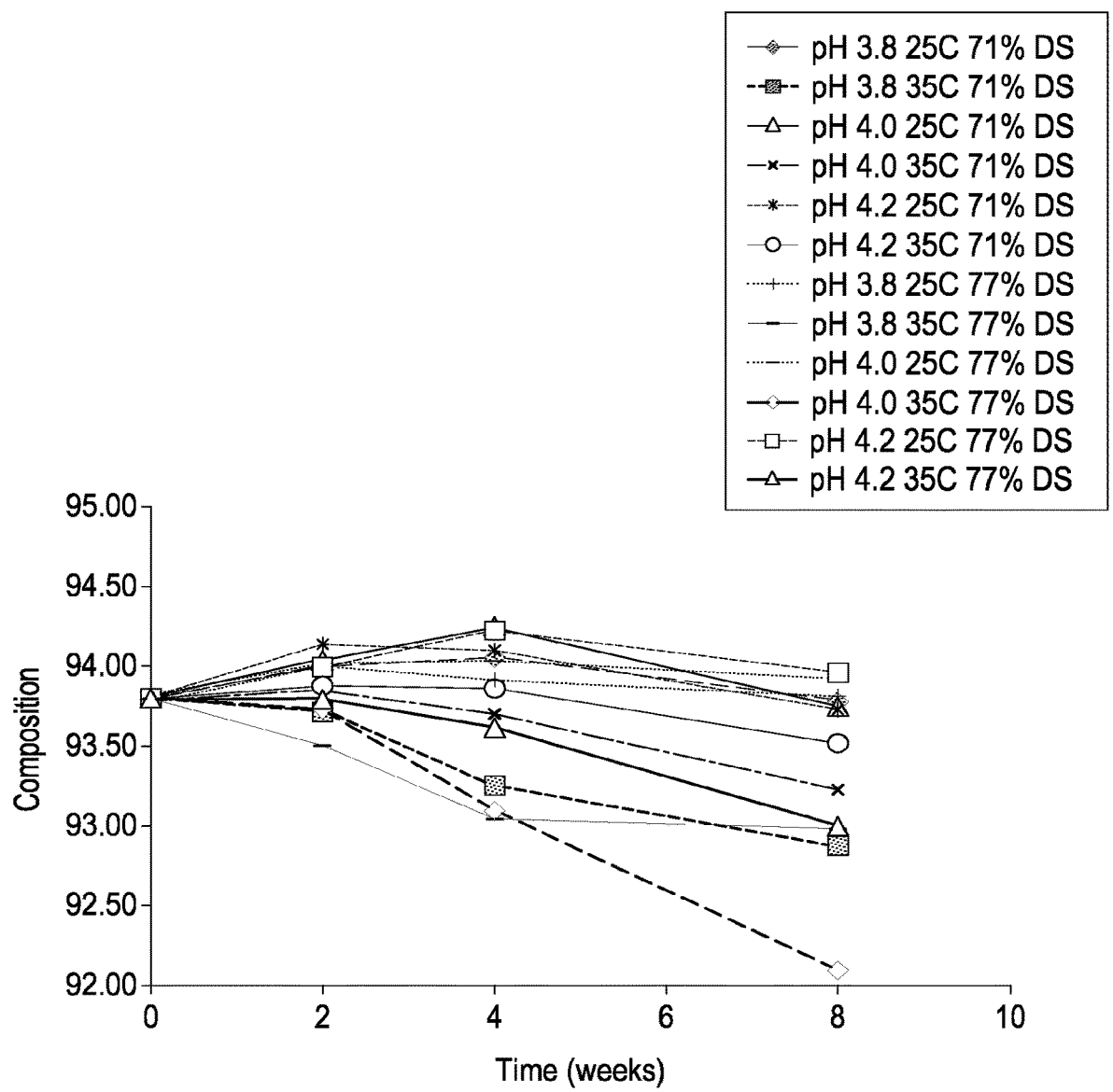
FIG. 18 shows how the allulose content of the allulose syrup product samples of Example 5 changes over time at different temperature, pH and DS content.

There is some divergence of composition in the ranges of 71-77%, 25-35° C., starting pH 3.8-4.2 (FIG. 18). Lower pH, higher DS and higher temperature all contribute to small changes in allulose content.

Figure 19:
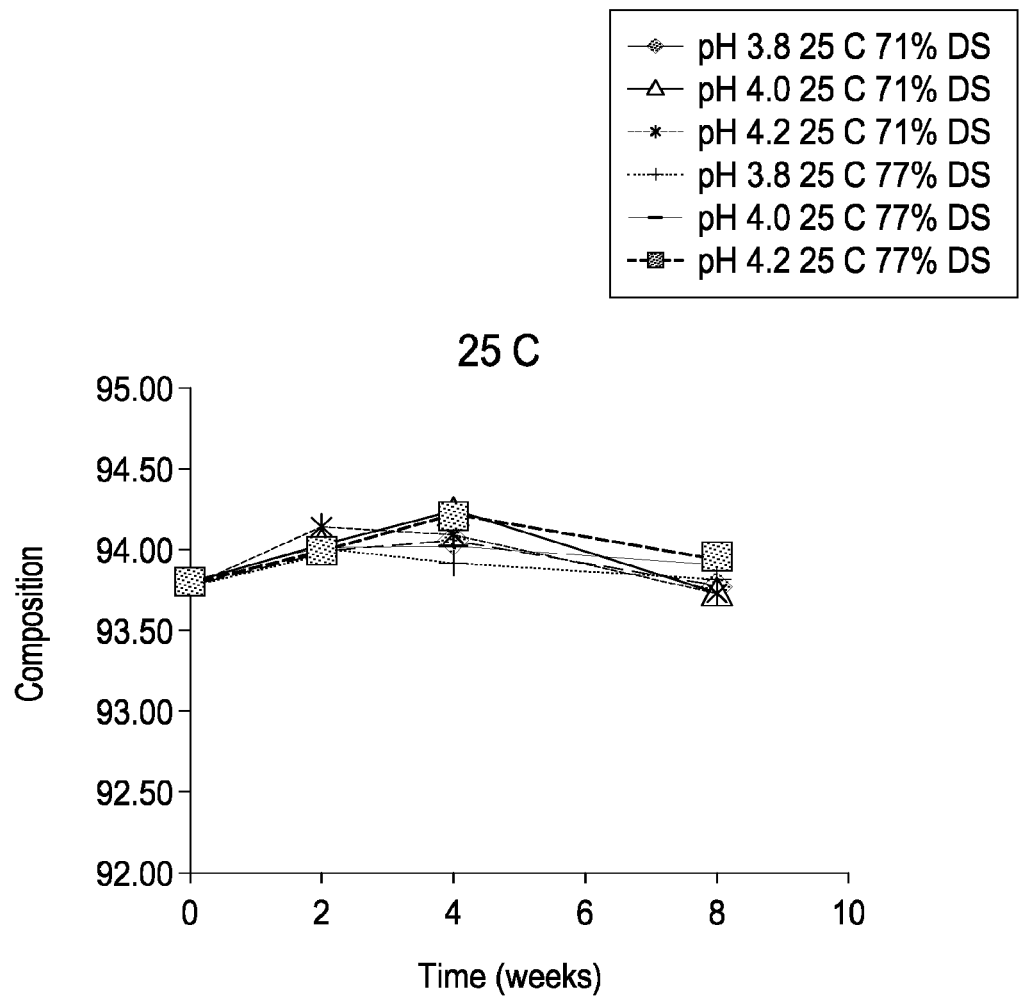
FIG. 19 shows how the allulose content of the allulose syrup product samples of Example 5 changes over time at 25° C.
Figure 20:
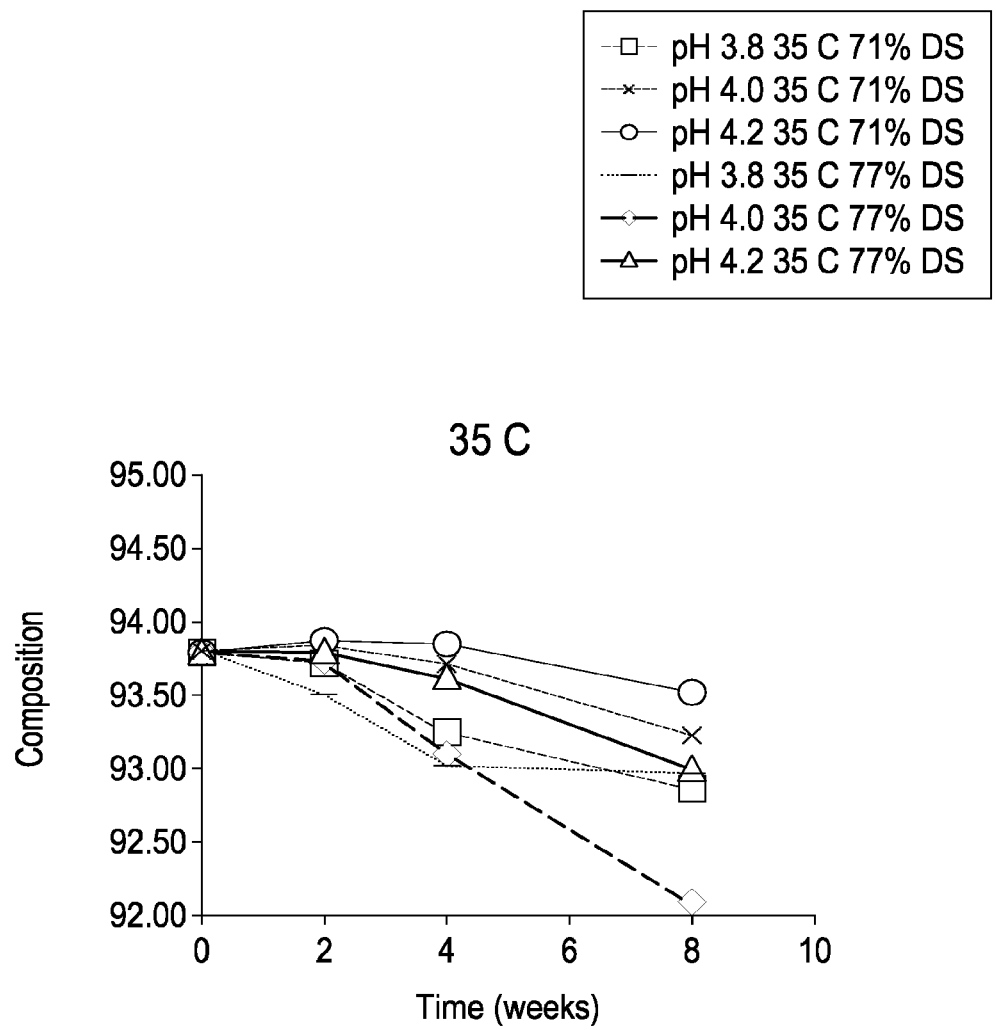
FIG. 20 shows how the allulose content of the allulose syrup product samples of Example 5 changes over time at 35° C.

All 25° C. (77° F.) data show essentially no change in composition, over the course of two months (FIG. 19). However, the 35° C. data show a moderate decrease in allulose content over the course of two months (0.5 to 1.5% decrease dependent on pH and % DS) (FIG. 20). Higher pH and lower DS appear to be more stable. Even within a narrow pH range of 3.8 to 4.2, higher pH was more stable compositionally at 35° C. At 25° C. there is no difference identified. These results highlight the surprisingly narrow, temperature, pH, and DS conditions required for allulose syrup stability.

Figure 21:
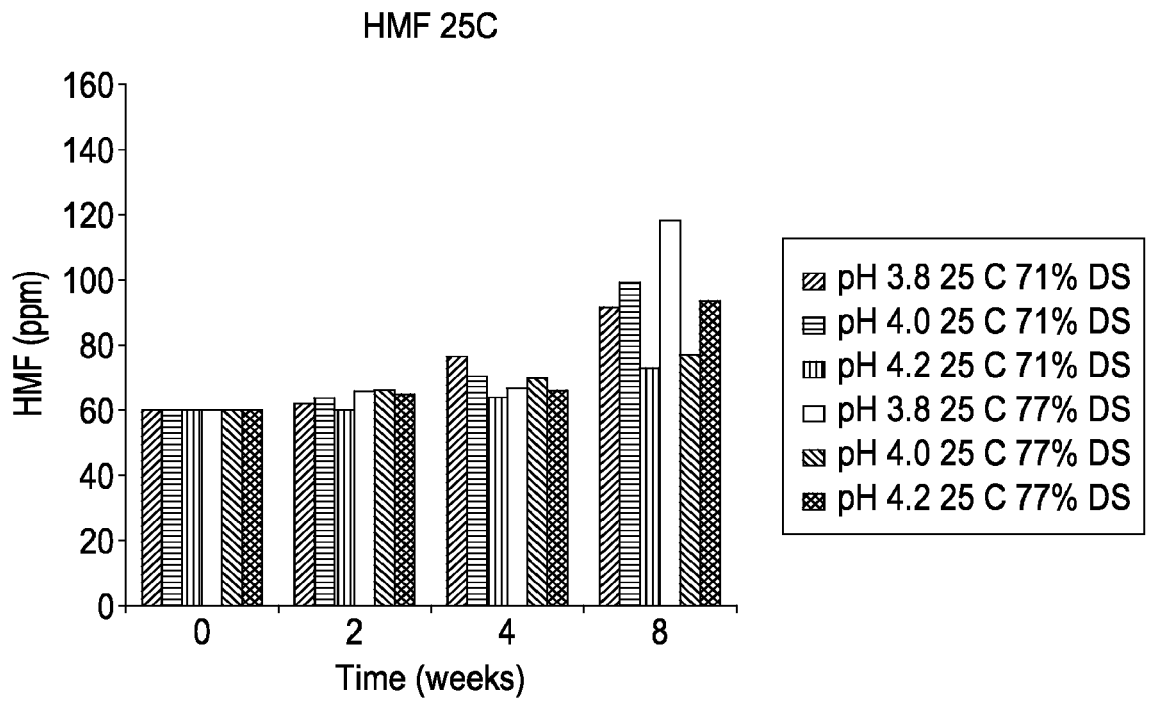
FIG. 21 shows how the HMF content of the allulose syrup product samples of Example 5 changes over time at 25° C.
Figure 22:
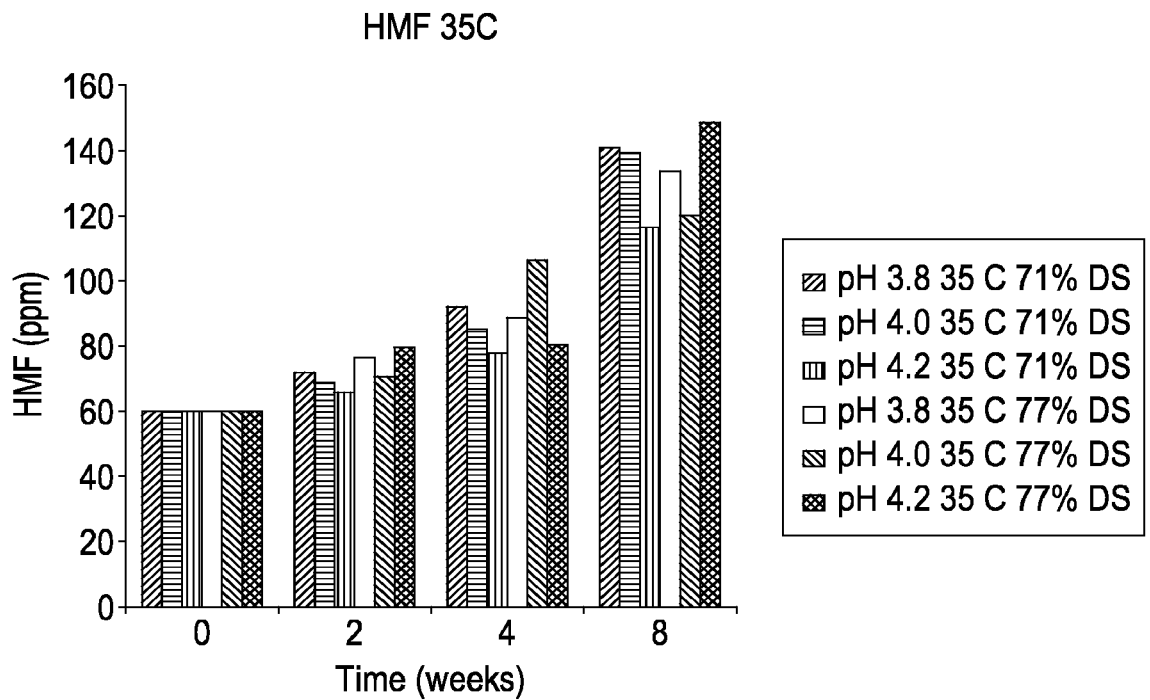
FIG. 22 shows how the HMF content of the allulose syrup product samples of Example 5 changes over time at 35° C.

HMF is an undesirable dehydration product from monosaccharide syrups. Here we can see that higher temperatures result in greater HMF formation (FIGS. 21 and 22). The results suggest that higher pH results in less HMF formation in the range of 3.8 to 4.2.

Figure 23:
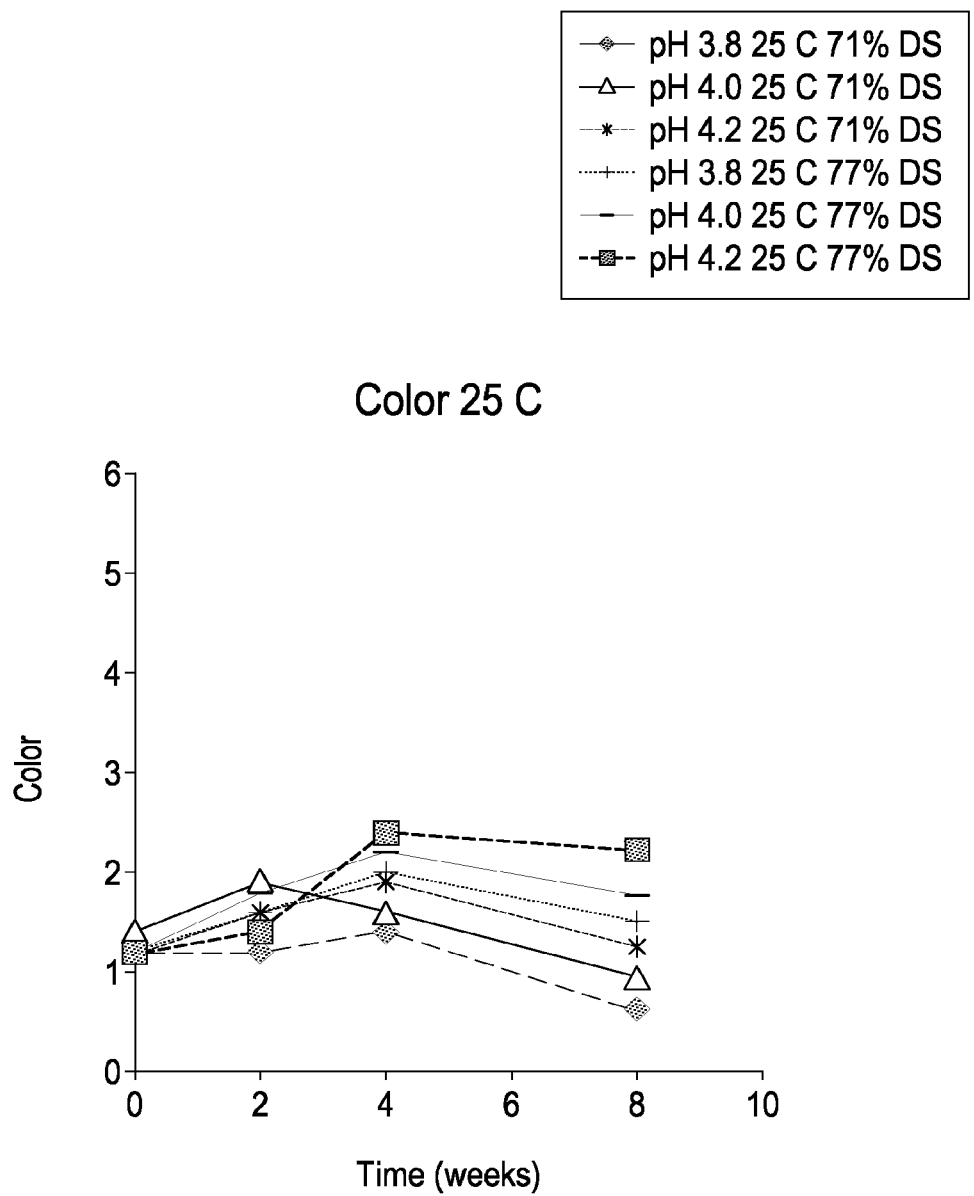
FIG. 23 shows how the color of the allulose syrup product samples of Example 5 changes over time at 25° C.
Figure 24:
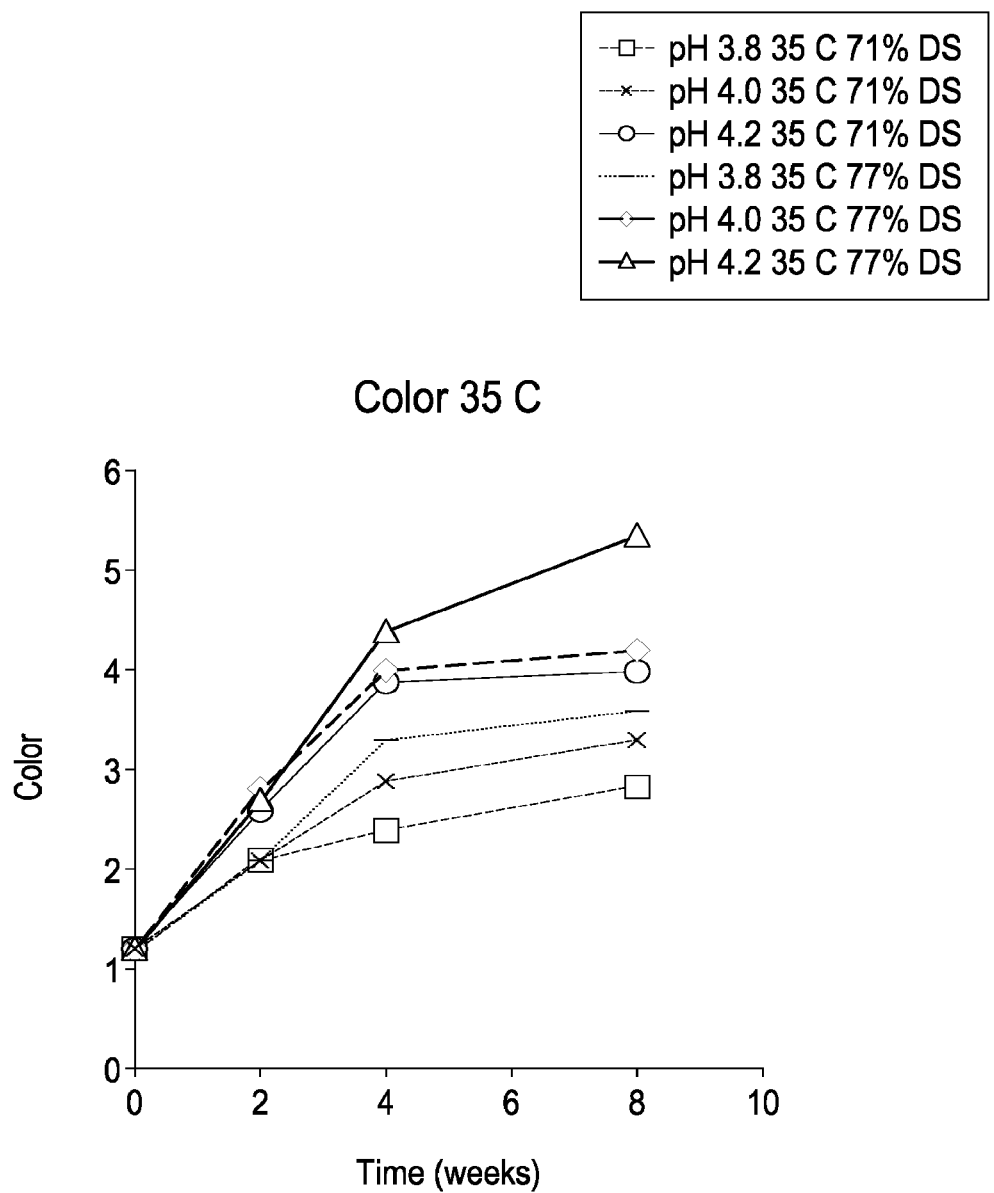
FIG. 24 shows how the color of the allulose syrup product samples of Example 5 changes over time at 35° C.

Temperature effect on color was dramatic (FIGS. 23 and 24). pH effect on color was also apparent with higher pH resulting in more color. DS % had a minor effect on color, with lower DS having lower color development; this was more pronounced at higher temperatures. This again demonstrates that there is a surprisingly narrow range for color and allulose content stability, which pH, DS, and temperature all have substantial effects.

The results demonstrate stability under the conditions tested for 25° C. At higher temperature, DS, and pH even within the narrow range have noticeable effects, with color developing fastest at higher DS and higher pH and allulose content changing most quickly with higher DS and lower pH. If higher temperatures higher than 25° C. will be encountered, a pH of 4.0 and 71% DS will help control color changes and allulose content changes.

Example 6—Stability Improvement with Syrup Additives

Additives have an effect on stability. These additives may stabilize the syrup by buffering the pH to help control at pH 4.0 and also to minimize oxidation.

One temperature 30° C. (86° F.) has been used to assess the effect of additives on stability.

Approximate composition of campaign 1 material:

| | Allulose % | pH | DS |
|---|---|---|---|
| Starting Material | 94 | 3.3 | 77.5 |

Method

Each sample consisted of 1000 mL of syrup in a plastic container. Two gallons of this material were pH adjusted to 4.0 using 1M sodium carbonate (NaCO$_3$), by slow and careful addition and regular pH measurement at 1:1 dilution. This material was then split into two separate containers and one was diluted to 71% DS (11.5 lbs 77% DS syrup, plus 0.97 lbs water).

After dilution, the samples were subsampled into 500 mL plastic containers. Fresh 10% solutions (25 mL) of ascorbate, isoascorbate, sodium citrate, sodium acetate, and 1% tocopherol acetate, and metabisulfite were prepared and pH adjusted with sodium carbonate to ~4.0 pH. 10 mL of these solutions were added and mixed in with the corresponding samples as in Table 6.

The following samples will be prepared as above and then placed in the 30° C. oven and sampled as Table 7 below.

TABLE 6

Samples

| DS | pH | Ascorbate | Iso-ascorbate | Sodium Citrate | Sodium Acetate | Tocopherol Acetate | Meta-bisulfite |
|---|---|---|---|---|---|---|---|
| 71 | 4.0 | 0.2% | | | | | |
| 71 | 4.0 | | 0.2% | | | | |
| 71 | 4.0 | | | 0.2% | | | |
| 71 | 4.0 | | | | 0.2% | | |
| 71 | 4.0 | | | | | 0.2% | |
| 71 | 4.0 | | | | | | 0.02% |
| 77 | 4.0 | 0.2% | | | | | |
| 77 | 4.0 | | 0.2% | | | | |
| 77 | 4.0 | | | 0.2% | | | |
| 77 | 4.0 | | | | 0.2% | | |
| 77 | 4.0 | | | | | 0.2% | |
| 77 | 4.0 | | | | | | 0.02% |

The sampling and testing schedule is detailed in Table 7.

TABLE 7

Stability Robustness Samples

| Sample | pH | Color Before Heat | DS RI (% as is) | Carbohydrates (% as is) | HMF |
|---|---|---|---|---|---|
| 0 Months | x | x | x | x | x |
| 1 Months | x | x | | x | X |
| 2 Months | x | X | | x | x |
| 4 Months | x | X | | x | x |
| 6 Months | x | x | x | x | x |

Results

Figure 25:
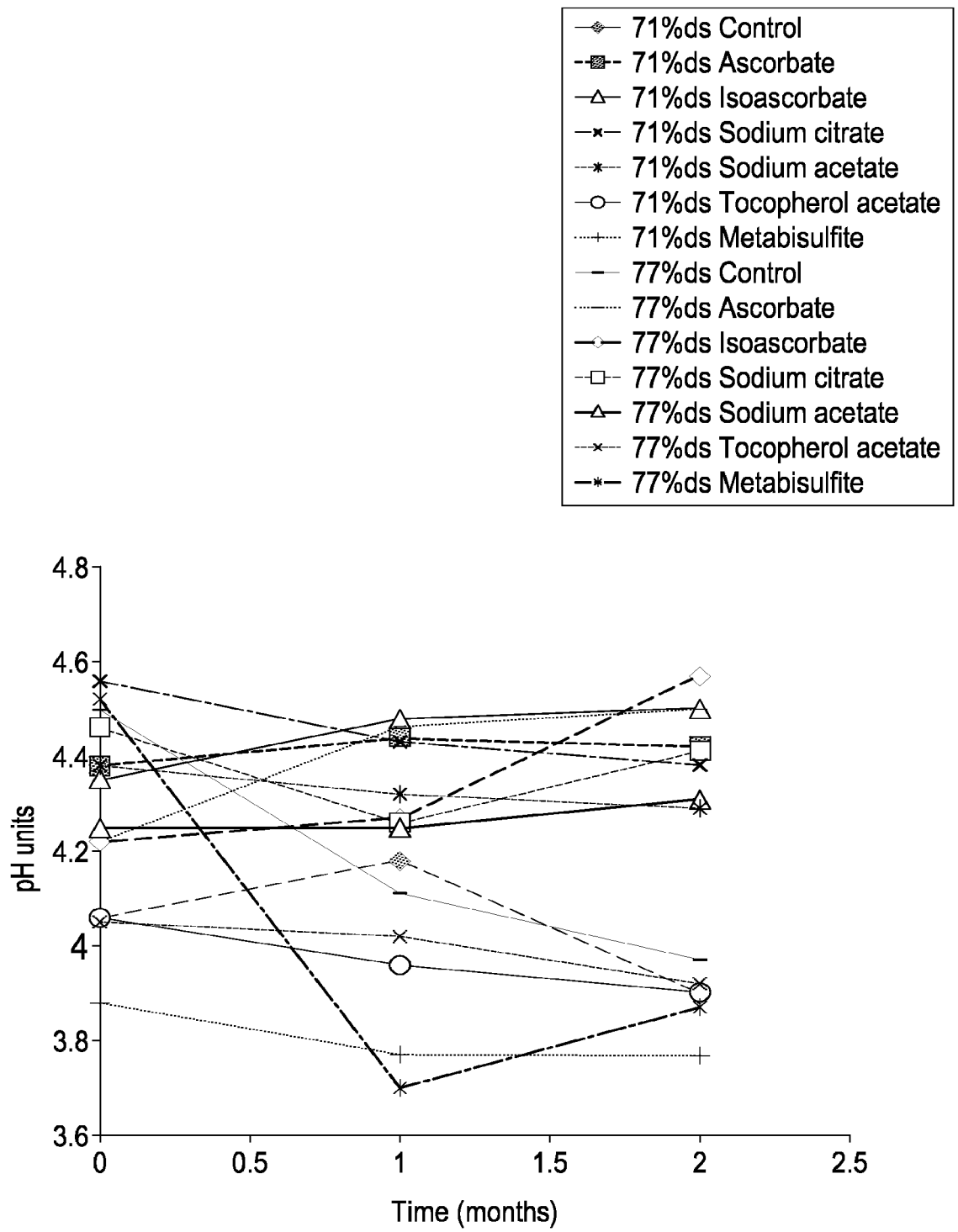
FIG. 25 shows how the pH of the allulose syrup product samples of Example 6 over time is affected by additives.

No dramatic changes in pH were observed at 2 months, although both controls appear to be trending downwards in pH (FIG. 25). As expected, the pH does not drop for the samples containing added buffering compounds: ascorbate, isoascorbate, citrate and acetate.

Figure 26:
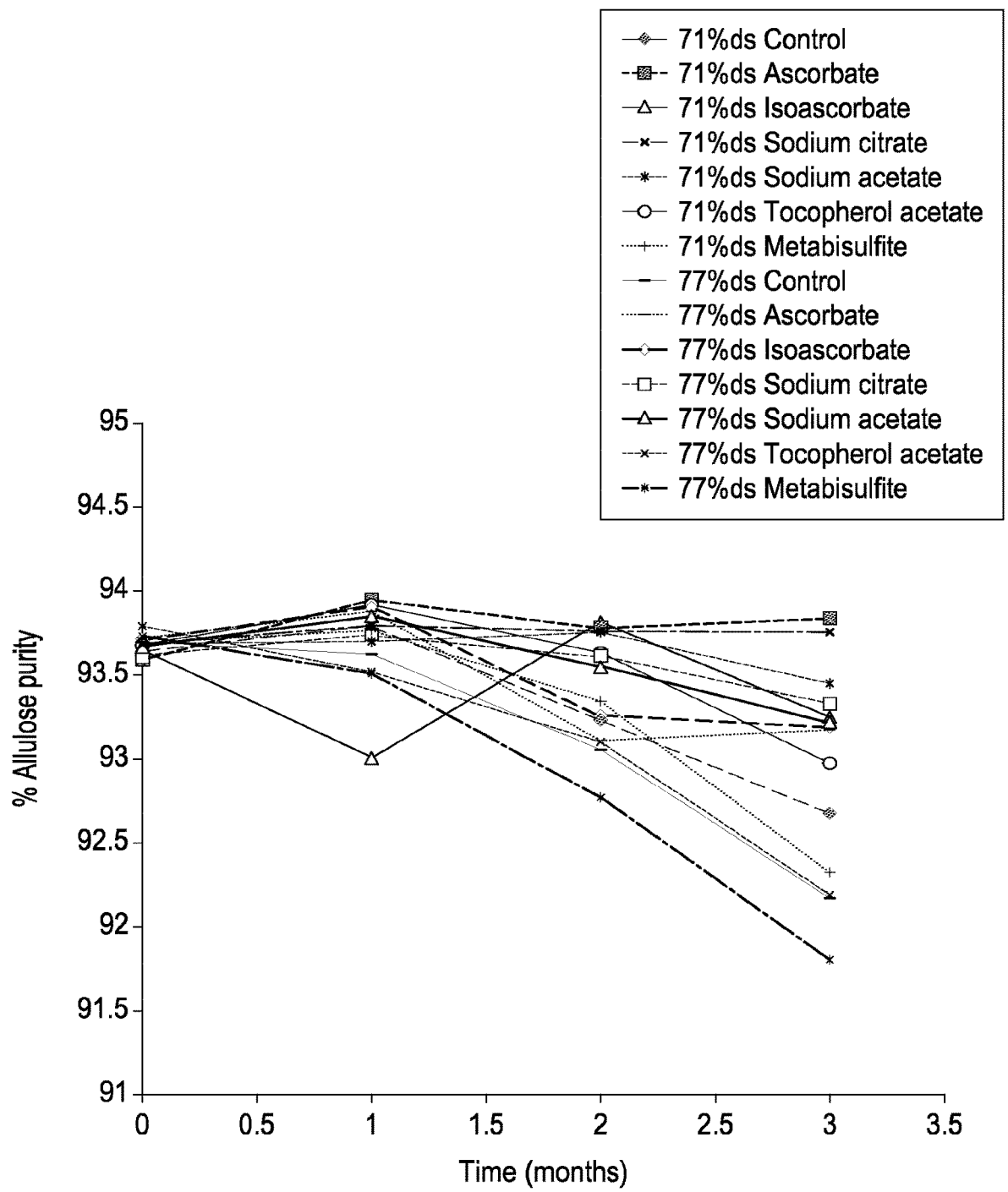
FIG. 26 shows how the allulose purity of the allulose syrup product samples of Example 6 over time is affected by additives.

No dramatic changes have been observed at 3 months at 30° C. in terms of composition (FIG. 26), but there are minor changes. It appears that added MBS may result in more rapid allulose content loss. Tocopherol acetate performs somewhat better than the control at 71% DS and about the same as the control at 77% DS.

Figure 27:
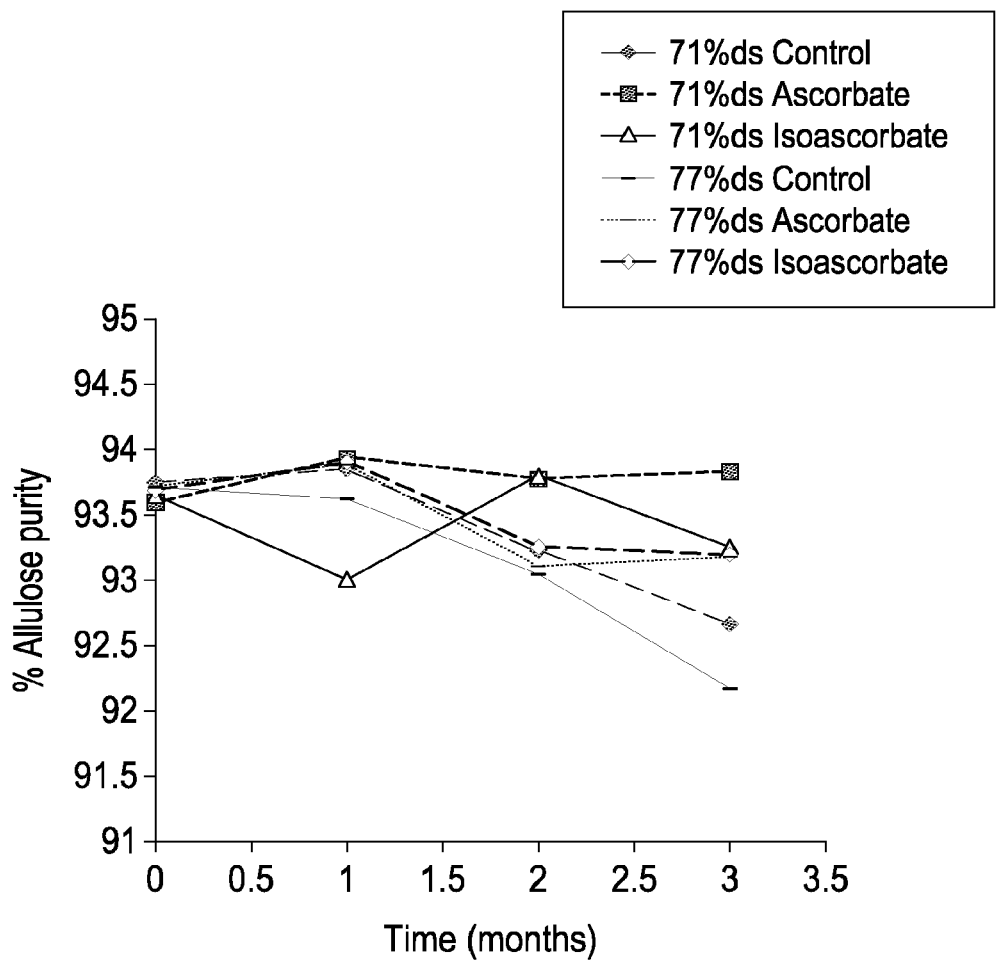
FIG. 27 shows how the allulose purity of the allulose syrup product samples of Example 6 over time is affected by the addition of ascorbate and isoascorbate.
Figure 28:
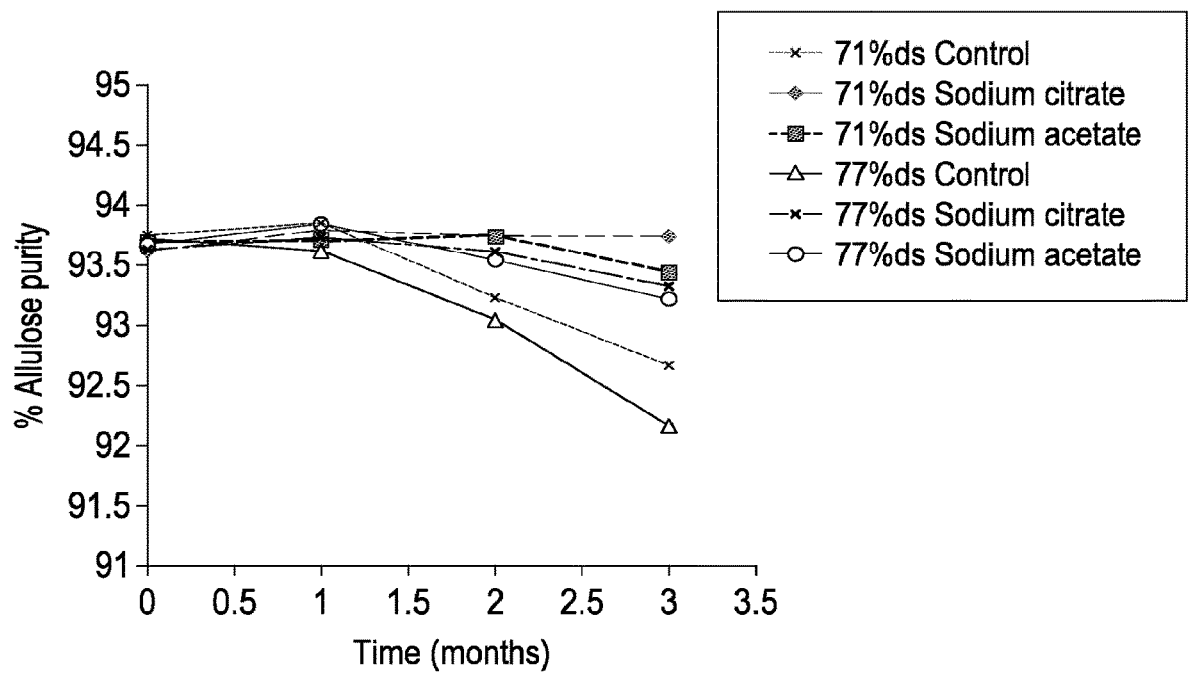
FIG. 28 shows how the allulose purity of the allulose syrup product samples of Example 6 over time is affected by the addition of citrate and acetate.

Addition of both ascorbate and isoascorbate (FIG. 27) and of both sodium citrate and sodium acetate (FIG. 28) controlled allulose content changes after 3 months storage at 30° C.

Figure 29:
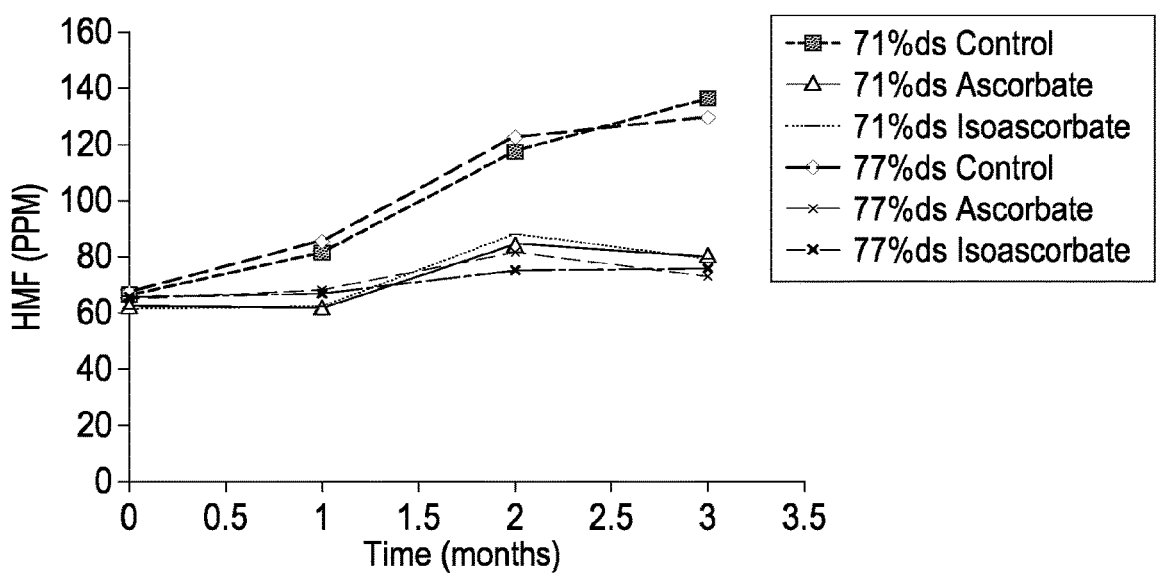
FIG. 29 shows how the HMF content of the allulose syrup product samples of Example 6 over time is affected by the addition of ascorbate and isoascorbate.

HMF increased in all samples. However, one subset of additive samples displayed a substantially smaller amount of HMF increase. The samples with reduced HMF increase were those containing either ascorbate or isoascorbate, displaying less than half the HMF increase of the control samples (FIG. 29).

Ascorbate and isoascorbate have the ability to control HMF formation, whereas, sodium citrate and sodium acetate showed promise at controlling pH and allulose content changes. Neither MBS nor tocopherol acetate addition resulted in a significant benefit.

Example 7—Surface Response Study of Temperature, pH and DS

The purpose of this study was to determine the effects and interplay of pH, DS, and temperature on product stability over a narrow range of product conditions.

Allulose Syrup was used for this study. Each sample consisted of 1 quart (1.14 liter) of Allulose Syrup in a 1 quart (1.14 liter) round plastic HDPE container. This container was chosen because it is made of the same material as ISBT totes used for customer storage. For each time/temperature combination, a single quart container was packed.

TABLE 8

Stability Sample Factors and Response

| Name | Units | Type | Std. Dev. | Low | High |
|---|---|---|---|---|---|
| Initial pH | pH | Factor | 0 | 3.5 | 4.5 |
| DS | % | Factor | 0 | 50 | 80 |
| Temperature | C. | Factor | 0 | 25 | 35 |
| HMF | ppm | Response | | | |
| Allulose | % | Response | | | |
| Color | CU | Response | | | |

Three factors and three responses were modeled using DOE software with the ranges for the variables of interest in Table 8. Additionally, resulting pH at the sample time points was measured.

The Box-Behnken design produced the following experiments in Table 9.

TABLE 9

| Run | Factor 1 A: pH pH | Factor 2 B: DS % | Factor 3 C: Temp ° C. |
|---|---|---|---|
| 1 | 4.5 | 50 | 30 |
| 2 | 3.5 | 65 | 25 |
| 3 | 4 | 65 | 30 |
| 4 | 3.5 | 80 | 30 |
| 5 | 3.5 | 65 | 35 |
| 6 | 4 | 50 | 25 |
| 7 | 4 | 65 | 30 |
| 8 | 4 | 80 | 25 |
| 9 | 4 | 65 | 30 |
| 10 | 4.5 | 65 | 25 |
| 11 | 4 | 65 | 30 |
| 12 | 3.5 | 50 | 30 |
| 13 | 4 | 65 | 30 |
| 14 | 4.5 | 80 | 30 |
| 15 | 4 | 80 | 35 |
| 16 | 4 | 50 | 35 |
| 17 | 4.5 | 65 | 35 |
| 18 | 4.0 | 71 | 25 |

Zero time samples were taken from each container and submitted for color, HMF, DP1-4, and pH analysis. Original containers were then placed in the appropriate stability chamber at 25° C., 30° C., or 35° C. as indicated in column factor 3 in Table 9.

After incubation for 3 weeks, 6 weeks, 3 months and 6 months, samples of each container were submitted for Color, HMF, DP1-4, and pH analysis. The results were analyzed using DOE software, and predictions for optimized conditions were generated. Contour plots were generated for allulose content, HMF, and color.

There were notable changes in allulose content over the six months of this response surface study.

Figure 30:
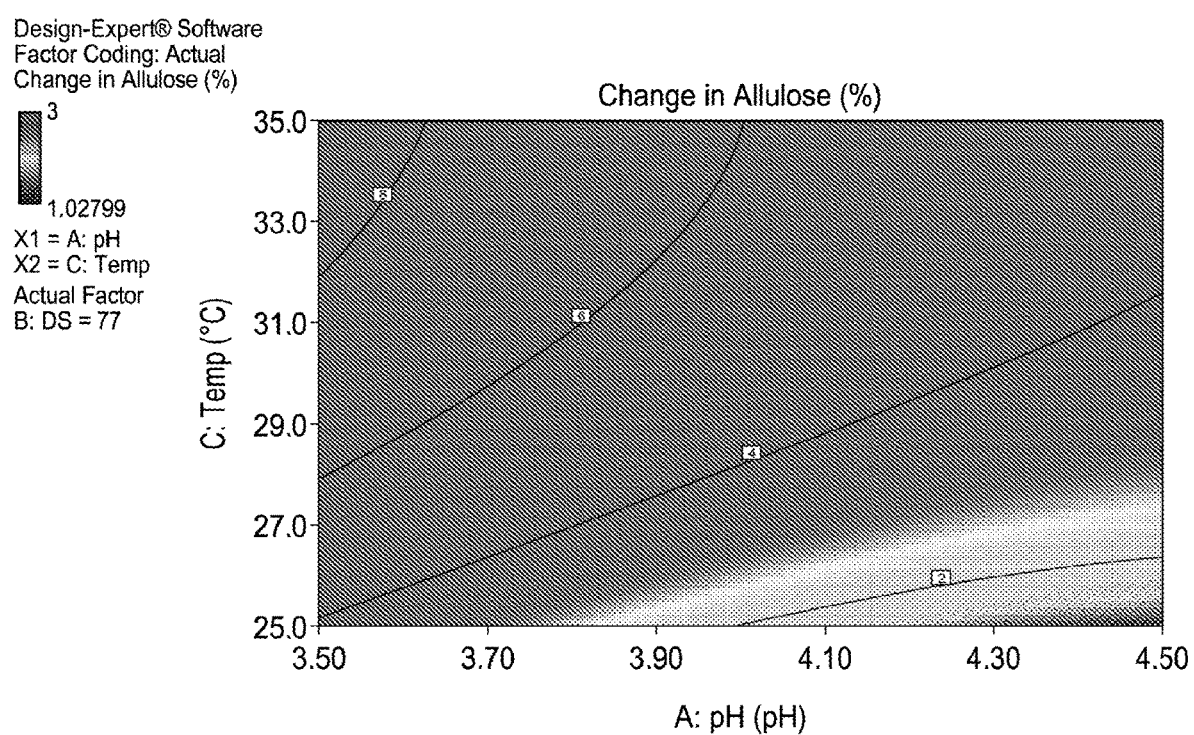
FIG. 30 shows the change in allulose content at 6 months at 77% DS as modelled using DOE software according to Example 7 (each contour line represents a 2% decrease in change in allulose content from time 0).

When looking at the response surface of change in allulose in relation to temperature and pH at 77% DS at 6 months as shown in FIG. 30, there is substantial failure space where allulose content changes by more than 2%. It is surprising that there is only a narrow window in the far right hand corner at pH greater than 4.0 and temperature less than 27° C. where the allulose content of the syrup does not change substantially.

Figure 31:
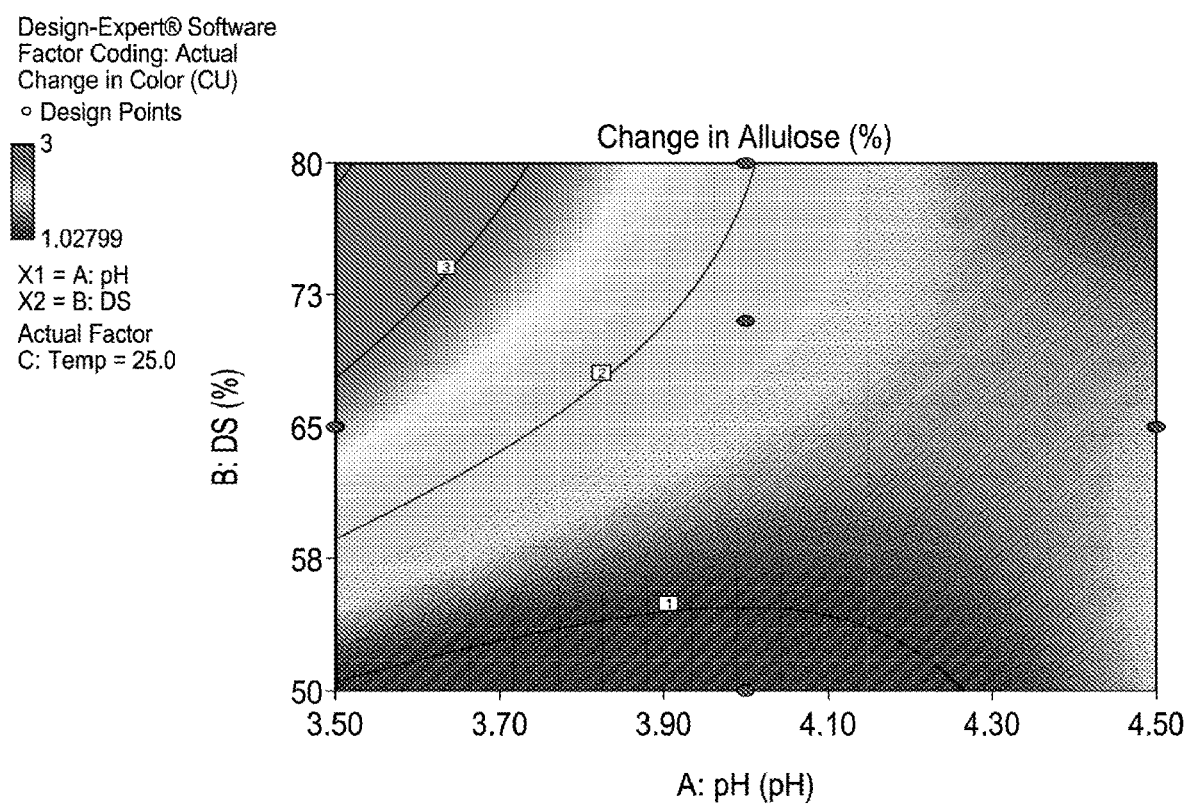
FIG. 31 shows the change in allulose content at 6 months at 25° C. as modelled using DOE software according to Example 7.

When looking at the change in allulose response surface for DS and pH at 25° C. (FIG. 31) it is clear that the desirable zone of low allulose content change gets smaller and smaller as DS increases. Keeping in mind that DS is bound on the low end by microstability at approximately 60% DS and at the high end by reactivity and crystallization at 78% DS, we can see that there is a narrow acceptable space where change in allulose content is acceptable. At 65% DS and above, 25° C. and a pH about 4.25 are essential for stability at 6 months.

Figure 32:
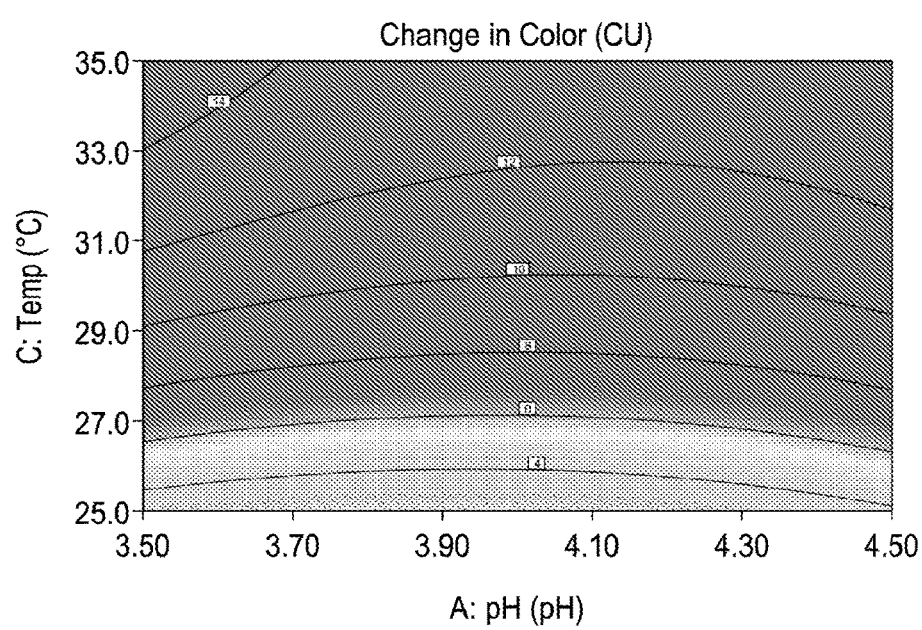
FIG. 32 shows color change at 6 months at 77% DS as modelled using DOE software according to Example 7.
Figure 33:
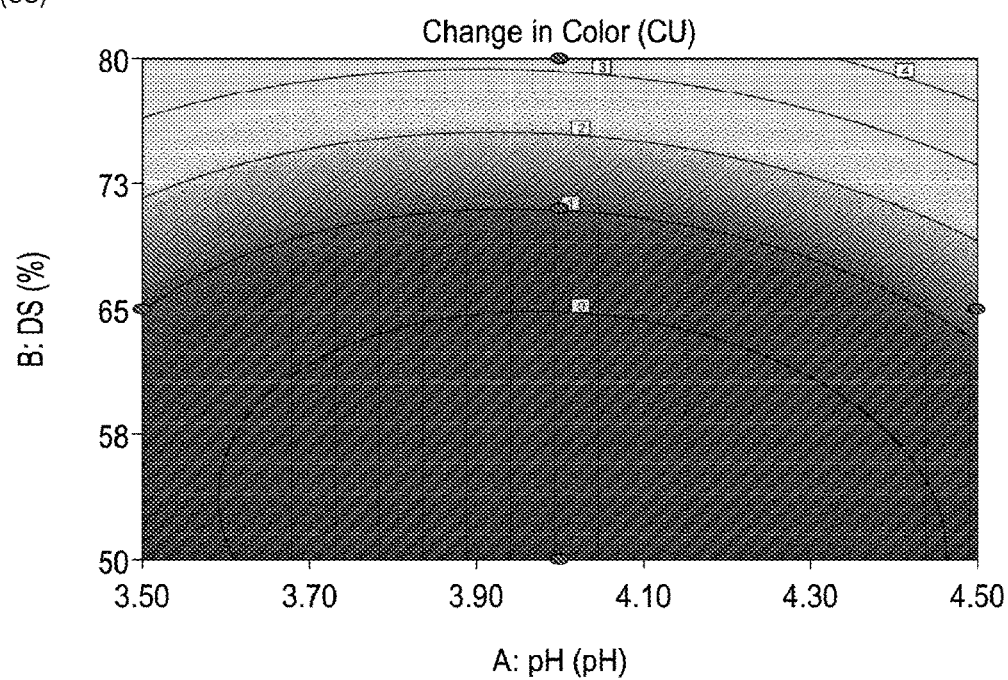
FIG. 33 shows color change at 6 months at 25° C. as modelled using DOE software according to Example 7.

The acceptable stable storage conditions are further bounded in terms of solids, pH, and storage temperature when color is considered. For use in food, colorless food ingredients are desired. In this experiment, color of the syrup was analyzed as absorbance at 450 nm with background subtracted at 600 nm. A change in color of more than 4 is generally considered unacceptable. When changes in color for 77% DS allulose syrup were modeled as a response surface after 6 months storage for temperature and pH (FIG. 32) we can see that both temperature and pH are critical factors. Temperature must be maintained near or below 25° C. and ideally at a pH between 3.7 and 4.2. Keeping in mind that crystallization at a DS of 77% begins to occur at temperatures below 25° C. and allulose content stability requires a pH greater than 4.0, this means that the ideal storage space at this DS is very narrow at a temperature of 25° C., pH 4.0-4.2. Further bounding this by DS between 60-78 for reactivity and microstability, it is clear from the pH and DS modeled response surface (FIG. 33) that lower DS is more stable for color generation, but the ideal pH is still near 4.0. Further consideration of the economical importance of a syrup containing the minimum amount of water possible to reduce shipping costs and allow the broadest use in food applications, this means that, practically, the stable space for economic use of allulose syrup that is shelf stable is very narrow. This is substantially different from other known saccharide syrups; for example, dextrose syrup is known to be reasonably stable to a variety of conditions and temperatures without developing substantial color, or reduction in dextrose content.

Figure 34:
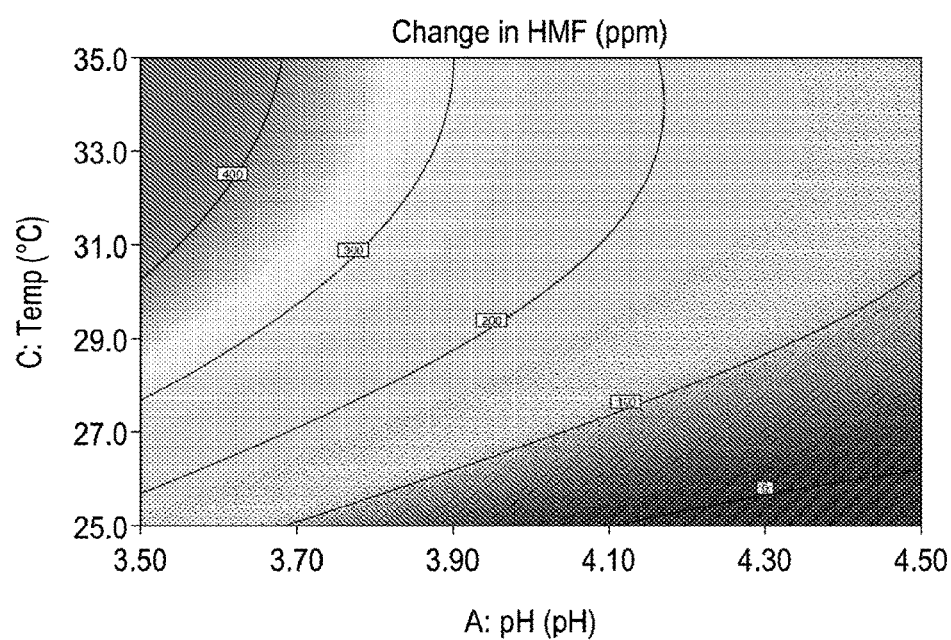
FIG. 34 shows HMF formation at 6 months and 77% DS as modelled using DOE software according to Example 7.

Hydroxymethylfurfural (HMF) is an undesirable dehydration product from monosaccharide syrups. FIG. 34 demonstrates the modeled temperature pH response surface for change in HMF at 77% DS. HMF production is highest at low pH and high temperature and is lowest at high pH and low temperature. Less than 100 ppm HMF is generally preferred for food ingredients. Thus, another pH boundary can be placed on allulose syrup: when stored at 25° C., it should be above pH 3.70.

Optimization: The modeled surface response data were used to minimize changes in allulose, HMF, and color. In the first case, no constraints were placed on pH, DS and temperature. Allulose content was given an importance of 3, and color and HMF an importance of 2. There were many solutions all with similar desirability scores and all of them had a recommended temperature of 25° C. and recommended DS of 50% with a pH range of 3.8-3.9. However, when DS is constrained to a microbially safe range and economically viable range of 71-78% DS, the desirable solutions all recommended a temperature of 25° C. and a pH range of 4.2-4.4.

Summary

The results of the response surface study combined with crystallization and microbial stability and reactivity studies demonstrate that stability of allulose syrup over a period of 6 months is dependent on a very narrow temperature, pH and DS range, which is unconventionally and surprisingly narrow for a saccharide solution.

Advantages of the Invention

A syrup form that is more stable has benefits in that it can be stored for longer time periods and still be saleable, it has broader customer appeal, it can be shipped to geographic locations that require lengthy shipping and holding times. Additionally, improved product stability means that the product as used will retain a higher quality of composition and taste. This is beneficial from a calorie labelling position and final consumer product quality position.

The invention claimed is:

1. An allulose syrup having a total dry solids content of from 70% to 80% by weight, and comprising allulose in an amount of at least 90% by weight on a dry solids basis, and wherein the pH of the syrup is from 3.5-4.5.

2. An allulose syrup according to claim 1, wherein the total dry solids content of the allulose syrup is from 71% to 78% by weight.

3. An allulose syrup according to claim 1, wherein the total dry solids content of the allulose syrup is from 71% to 73% by weight.

4. An allulose syrup according to claim 1, wherein the total dry solids content of the allulose syrup is from 76% to 78% by weight.

5. An allulose syrup according to claim 1, wherein the pH of the allulose syrup is from 3.8 to 4.2.

6. An allulose syrup according to claim 1, wherein the allulose syrup comprises allulose in an amount of at least 95% by weight on a dry solids basis.

7. An allulose syrup according to claim 1, wherein the allulose syrup comprises less than 1000 ppm of HMF.

8. An allulose syrup according to claim 1, wherein the allulose syrup comprises sulfur dioxide in an amount of from 0.1 to 20 ppm.

9. An allulose syrup according to claim 1, wherein the allulose syrup comprises less than 10 parts per billion of isovaleraldehyde.

10. An allulose syrup according to claim 1, wherein the allulose syrup comprises less than 2 parts per billion of 2-aminoacetophenone.

11. An allulose syrup according to claim 1, wherein the allulose syrup further comprises one or more additives.

12. An allulose syrup according to claim 11, wherein the one or more additives include a stability-enhancing additive.

13. An allulose syrup according to claim 12, wherein the stability-enhancing additive is included at around 0.01-2.0% by weight based on the total weight of the allulose syrup.

14. An allulose syrup according to claim 11, wherein the one or more additives include a buffer or anti-oxidant.

15. An allulose syrup according to claim 14, wherein the allulose syrup comprises buffer at a concentration of around 0.01-2.0% by weight based on the total weight of the allulose syrup.

16. An allulose syrup according to claim 11, wherein the one or more additives include one or more additives selected from the group consisting of ascorbic acid and salts thereof; isoascorbic acid (erythorbate) and salts thereof; citric acid and salts thereof; acetic acid and salts thereof; salts of bisulfite and metabisulfite; and tocopherol acetate.

17. A process for preparing the allulose syrup according claim 1, wherein the process comprises:
   providing an allulose syrup;
   adjusting the dry solids content of the allulose syrup such that it is from 70% to 80% by weight;
   adjusting the allulose content of the allulose syrup such that allulose is present in an amount of at least 90% by weight on a dry solids basis; and
   controlling the pH of the allulose syrup so that it is from 3.5 to 4.5.

18. A process according to claim 17, wherein the process further comprises adding one or more additives to the syrup.

19. A method of preparing a food or beverage product comprising combining the allulose syrup according to claim 1 and at least one additional food or beverage ingredient.

20. A food or beverage product comprising an allulose syrup according to claim 1 and at least one additional food or beverage ingredient.

21. The food or beverage product of claim 20, wherein the at least one additional food or beverage ingredient includes at least one ingredient selected from the group consisting of flavorants, colorants, sweeteners other than allulose, dietary fibers, acidulants, water, and combinations thereof.

22. An allulose syrup according to claim 1 where shelf-life as defined by maintaining an allulose content of greater than 90% by weight on a dry solids basis is at least 3 months.

23. An allulose syrup according to claim 1 where shelf-life as defined by maintaining an allulose content of greater than 95% on a dry solids basis is at least 3 months.

24. The food or beverage product of claim 20, wherein the at least one additional food or beverage ingredient includes dietary fibers.

25. The food or beverage product of claim 24, wherein the dietary fibers comprise soluble dietary fibers.

26. The food or beverage product of claim 25, where the soluble dietary fibers comprise soluble corn fiber, polydextrose or a combination thereof.

27. The food or beverage product of claim 25, where the soluble dietary fibers comprise soluble corn fiber.

* * * * *